US012803331B2

(12) United States Patent
Tachiwa

(10) Patent No.: US 12,803,331 B2

(45) Date of Patent: Nov. 17, 2026

(54) POWER RECEIVING APPARATUS, POWER TRANSMITTING APPARATUS, CONTROL METHOD, AND STORAGE MEDIUM

(71) Applicant: CANON KABUSHIKI KAISHA, Tokyo (JP)

(72) Inventor: Wataru Tachiwa, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 392 days.

(21) Appl. No.: 18/051,812

(22) Filed: Nov. 1, 2022

(65) Prior Publication Data

US 2023/0097511 A1 Mar. 30, 2023

Related U.S. Application Data

(63) Continuation of application No. PCT/JP2021/013891, filed on Mar. 31, 2021.

(30) Foreign Application Priority Data

May 8, 2020 (JP) ................................ 2020-082819

(51) Int. Cl.

*H02J 50/12* (2016.01)
*H02J 50/60* (2016.01)
*H02J 50/80* (2016.01)

(52) U.S. Cl.

CPC .............. *H02J 50/12* (2016.02); *H02J 50/60* (2016.02); *H02J 50/80* (2016.02)

(58) Field of Classification Search

CPC ............. H02J 50/12; H02J 50/80; H02J 50/60
USPC .......................................................... 307/104
See application file for complete search history.

(56) References Cited

U.S. PATENT DOCUMENTS 8,169,185 B2 * 5/2012 Partovi ................. H02J 50/005 320/108
8,620,484 B2 12/2013 Baarman et al.
8,957,549 B2 * 2/2015 Kesler ...................... H03H 7/40 307/104
9,148,201 B2 9/2015 Kallal et al.
9,294,153 B2 * 3/2016 Muratov ................. H02J 50/12
9,505,315 B2 * 11/2016 Garcia Briz ............. G01V 3/10
9,735,623 B2 * 8/2017 Byun ...................... B60L 53/12
9,793,717 B2 * 10/2017 White, II ................. H04B 5/24
9,859,719 B2 * 1/2018 Vuori ........................ H02J 7/04
9,929,601 B2 3/2018 White, II et al.
9,985,481 B2 * 5/2018 Elad ........................ H02J 7/007
9,991,731 B2 6/2018 Ichikawa
10,164,600 B2 * 12/2018 Kormann ........... G06K 7/10217
10,530,196 B2 * 1/2020 Oettinger ................ H02J 50/80
(Continued)

FOREIGN PATENT DOCUMENTS

CN 102414955 A 4/2012
CN 102638110 A 8/2012
(Continued)

*Primary Examiner* — Alfonso Perez Borroto

(74) *Attorney, Agent, or Firm* — Canon U.S.A., Inc. IP Division

(57) ABSTRACT

A power receiving apparatus outputs power wirelessly received from the power transmitting apparatus to a load, and performs processing for updating a parameter used by the power transmitting apparatus for detecting an object different from the power receiving apparatus based on a change in a voltage applied to the load.

11 Claims, 15 Drawing Sheets

(56) References Cited

U.S. PATENT DOCUMENTS

| | | | |
|---|---|---|---|
| 10,790,703 | B2 | 9/2020 | Yoden |
| 10,938,243 | B2 | 3/2021 | Kim et al. |
| 11,005,285 | B2 * | 5/2021 | Partovi .................. H04B 5/263 |
| 2009/0127936 | A1 | 5/2009 | Kamijo et al. |
| 2009/0322280 | A1 | 12/2009 | Kamijo et al. |
| 2010/0315038 | A1 * | 12/2010 | Terao ...................... H01F 38/14 320/108 |
| 2010/0315039 | A1 * | 12/2010 | Terao ...................... H01F 38/14 320/108 |
| 2011/0196544 | A1 | 8/2011 | Baarman et al. |
| 2012/0153894 | A1 | 6/2012 | Widmer |
| 2012/0212070 | A1 * | 8/2012 | Tanabe .................... H02J 50/60 307/104 |
| 2012/0299391 | A1 | 11/2012 | Tanabe |
| 2013/0033235 | A1 | 2/2013 | Fukaya |
| 2013/0162220 | A1 * | 6/2013 | Iijima ..................... H02J 50/60 320/137 |
| 2013/0241293 | A1 * | 9/2013 | Yamaguchi ........ G03G 15/5004 307/66 |
| 2013/0285618 | A1 * | 10/2013 | Iijima ................... B60L 53/124 307/104 |
| 2014/0292094 | A1 * | 10/2014 | Tsukamoto ............. H02J 50/10 307/104 |
| 2015/0054453 | A1 * | 2/2015 | White, II ........... G01R 29/0814 320/108 |
| 2015/0054454 | A1 | 2/2015 | White, II et al. |
| 2015/0115728 | A1 | 4/2015 | Yamamoto et al. |
| 2015/0145341 | A1 | 5/2015 | Chiyo |
| 2015/0280453 | A1 * | 10/2015 | Ikefuji ..................... H04B 5/79 320/108 |
| 2015/0349541 | A1 * | 12/2015 | Yamamoto ............ H02J 50/402 307/104 |
| 2015/0372496 | A1 * | 12/2015 | Lee ......................... H02J 50/12 307/104 |
| 2016/0211703 | A1 | 7/2016 | Eguchi |
| 2016/0372976 | A1 | 12/2016 | Shimura |
| 2017/0093214 | A1 * | 3/2017 | Watanabe ............... H02J 50/60 |
| 2017/0117750 | A1 * | 4/2017 | Tsukamoto ............. H02J 50/10 |
| 2017/0155280 | A1 | 6/2017 | Okamoto |
| 2017/0324252 | A1 * | 11/2017 | Yamamoto ............ H02J 50/402 |
| 2018/0131218 | A1 * | 5/2018 | Shellhammer .......... H02J 7/007 |
| 2018/0269714 | A1 | 9/2018 | Samuelsson et al. |
| 2018/0301946 | A1 | 10/2018 | Eguchi |
| 2019/0013703 | A1 | 1/2019 | Shichino |
| 2019/0020210 | A1 | 1/2019 | Partovi |
| 2019/0312462 | A1 | 10/2019 | Shichino |
| 2019/0334583 | A1 | 10/2019 | Tsukamoto |
| 2020/0259369 | A1 | 8/2020 | Stingu et al. |
| 2021/0066973 | A1 | 3/2021 | Park et al. |

FOREIGN PATENT DOCUMENTS

| | | | |
|---|---|---|---|
| CN | 103852631 | A | 6/2014 |
| CN | 105449799 | A | 3/2016 |
| CN | 105474511 | A | 4/2016 |
| CN | 106560980 | A | 4/2017 |
| CN | 108702032 | A | 10/2018 |
| EP | 3376638 | A2 | 9/2018 |
| EP | 3457527 | A1 | 3/2019 |
| EP | 4007122 | A1 | 6/2022 |
| EP | 4009489 | A1 | 6/2022 |
| JP | 2015-033246 | A | 2/2015 |
| JP | 2015-104141 | A | 6/2015 |
| JP | 2016-531538 | A | 10/2016 |
| JP | 2017-070074 | A | 4/2017 |
| JP | 2017-085716 | A | 5/2017 |
| JP | 2017-099230 | A | 6/2017 |
| JP | 2017-537598 | A | 12/2017 |
| JP | 2018-108014 | A | 7/2018 |
| JP | 2018133993 | A | 8/2018 |
| JP | 2019-187043 | A | 10/2019 |
| JP | 2020072577 | A | 5/2020 |
| WO | 2015/007696 | A1 | 1/2015 |
| WO | 2016/091764 | A1 | 6/2016 |
| WO | 2019139326 | A1 | 7/2019 |

* cited by examiner

FIG. 8

800

| | RECEIVED POWER [W] | POWER LOSS [W] |
|---|---|---|
| 801 | 0.1 | 0.6 |
| 802 | 4.9 | 1.6 |
| 803 | 9.9 | 3.5 |
| | ⋮ | ⋮ |

FIG. 10

1001

| GP | OUTPUT VOLTAGE FOR CHARGING UNIT |
|---|---|
| 0W OR MORE; LESS THAN 15W | 5V |
| 15W OR MORE; LESS THAN 27W | 9V |
| 27W OR MORE; LESS THAN 45W | 15V |
| 45W OR MORE | 20V |

1002

| GP | INPUT VOLTAGE FOR POWER TRANSMITTING UNIT |
|---|---|
| 0W OR MORE; LESS THAN 15W | 5V |
| 15W OR MORE; LESS THAN 27W | 9V |
| 27W OR MORE; LESS THAN 45W | 15V |
| 45W OR MORE | 20V |

1201

| POWER CONSUMPTION | OUTPUT VOLTAGE FOR CHARGING UNIT |
|---|---|
| 0W OR MORE; LESS THAN 15W | 5V |
| 15W OR MORE; LESS THAN 27W | 9V |
| 27W OR MORE; LESS THAN 45W | 15V |
| 45W OR MORE | 20V |

1202

POWER RECEIVING APPARATUS, POWER TRANSMITTING APPARATUS, CONTROL METHOD, AND STORAGE MEDIUM

CROSS-REFERENCE TO RELATED APPLICATIONS

This application is a Continuation of International Patent Application No. PCT/JP2021/013891, filed Mar. 31, 2021, which claims the benefit of Japanese Patent Application No. 2020-082819, filed May 8, 2020, both of which are hereby incorporated by reference herein in their entireties.

BACKGROUND

Field

The present disclosure relates to a power receiving apparatus, a power transmitting apparatus, a control method, and a program associated with wireless power transmission.

Background Art

In recent years, techniques for wireless power transmission systems, such as wireless charging systems, have been developed widely. PTL 1 describes a power transmitting apparatus and a power receiving apparatus that comply with the standards developed by the Wireless Power Consortium (WPC), an organization for standardizing wireless charging (hereinafter referred to as "WPC standards"). Also, PTL 1 describes calibration processing defined by the WPC standards, which is intended to increase the accuracy of detection of a conductive object (foreign object), such as a metallic piece.

In calibration processing, received power in a power receiving apparatus and a power loss at that time are acquired in each of two different states. A power loss is derived as the difference between transmitted power of a power transmitting apparatus and received power in a power receiving apparatus. Then, using the pairs of the received power and the power loss in these two states as parameters, a power loss that is expected from received power notified from the power receiving apparatus in wireless power transmission is derived, and the actual power loss is compared with the expected power loss. In a case where the difference between the actual power loss and the expected power loss exceeds a predetermined value, it can be determined that there has been a power loss attributed to a foreign object, that is to say, a foreign object exists.

Meanwhile, Universal Serial Bus Power Delivery (USB PD) is becoming widespread as a standard for supplying power that is intended to, for example, fast-charge a battery by wire. According to USB PD, control is performed so that, if the power supplied to a load increases, the voltage output to the load is increased accordingly. In this way, even if the supplied power increases, the current is kept low; thus, the loss and heat generation in circuits are suppressed, and power can be supplied to the load while maintaining high efficiency.

In a case where an output voltage to a load is changed in accordance with a change in received power on a power receiving apparatus used in wireless power transmission, the status of the power loss in the power receiving apparatus changes before and after the output voltage is changed. Therefore, if detection of a foreign object is performed in the state after the output voltage is changed while using a pair of received power and a power loss acquired in the state before the output voltage is changed as parameters for detection of the foreign object, there is a possibility that the accuracy of detection of the foreign object decreases.

CITATION LIST

Patent Literature

PTL1: Japanese Patent Laid-Open No. 2017-070074

SUMMARY

The present disclosure provides a technique to suppress a decrease in the accuracy of foreign object detection processing based on a power loss even if the output voltage to a load has been changed in a power receiving apparatus.

According to one aspect of the present disclosure, there is provided a power receiving apparatus, comprising: a power receiving unit configured to receive power wirelessly transmitted from a power transmitting apparatus; an output unit configured to output power received by the power receiving unit to a load; and a processing unit configured to perform processing related to a parameter used in detection processing for detecting an object different from the power receiving apparatus, wherein the processing unit reperforms the processing related to the parameter used in the detection processing based on a change in a voltage applied to the load.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the present disclosure and, together with the description, serve to explain principles of the present disclosure.

FIG. 8 is a diagram showing the contents of parameters for foreign object detection processing according to the first embodiment.

FIG. 10 is a diagram showing a relationship between GP and an output voltage to a charging unit (1001), and a relationship between GP and an input voltage to a power transmitting unit (1002).

DESCRIPTION OF THE EMBODIMENTS

Figure 1:
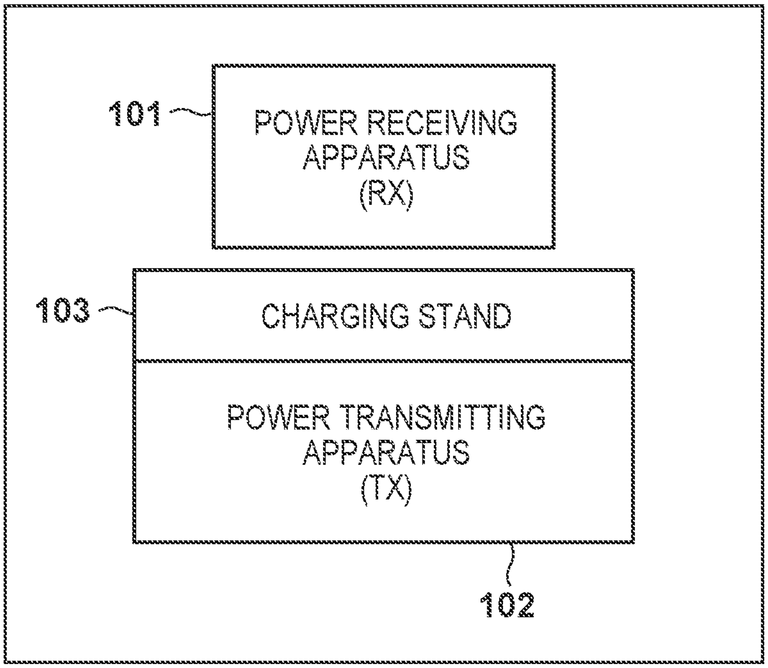
FIG. 1 is a diagram showing an exemplary configuration of a wireless charging system according to an embodiment.

Hereinafter, embodiments will be described in detail with reference to the attached drawings. Note, the following embodiments are not intended to limit the scope of the present disclosure. Multiple features are described in the embodiments, but limitation is not made to the present disclosure that requires all such features, and multiple such features may be combined as appropriate. Furthermore, in the attached drawings, the same reference numerals are given to the same or similar configurations, and redundant description thereof is omitted.

First Embodiment (System Configuration)

FIG. 1 shows an exemplary configuration of a wireless charging system (a wireless power transmission system) according to the present embodiment. The present system is configured to include a power receiving apparatus 101 and a power transmitting apparatus 102. Below, the power receiving apparatus may be referred to as an RX, and the power transmitting apparatus may be referred to as a TX. The TX 102 is an electronic device that transmits power wirelessly to the RX 101 placed on a charging stand 103. The RX 101 is an electronic device that receives power wirelessly transmitted from the TX 102, and charges an internal battery. The following description is provided using an exemplary case where the RX 101 is placed on the charging stand 103. Note, it is sufficient that the RX 101 be present in the range in which the TX 102 can transmit power during power transmission from the TX 102 to the RX 101, and the RX 101 need not necessarily be placed on the charging stand 103.

Also note, the RX 101 and the TX 102 can each have a function of executing applications other than wireless charging. One example of the RX 101 is a mobile information device that operates on a rechargeable battery, such as a laptop PC (Personal Computer), a tablet PC, and a smartphone. Also, one example of the TX 102 is an accessory device for charging that mobile information device. Note that the RX 101 and the TX 102 may be a storage apparatus such as a hard disk apparatus and a memory apparatus, and may be an information processing apparatus such as a personal computer (PC). Also, the RX 101 and the TX 102 may be, for example, an image input apparatus such as an image capturing apparatus (e.g., a camera or a video camera) and a scanner, or may be an image output apparatus such as a printer, a copier, and a projector. Furthermore, the TX 102 may be a mobile information device. In this case, the RX 101 may be another mobile information device, or may be wireless earphones. Also, the RX 101 may be an automobile. Furthermore, the TX 102 may be a charger installed in, for example, a console inside an automobile.

Moreover, although one RX 101 and one TX 102 are described in the present embodiment, the present disclosure is not limited to this. The present disclosure is also applicable to, for example, a configuration in which a plurality of RXs 101 receive power transmitted from one TX 102 or discrete TXs 102.

The present system performs wireless power transmission that uses an electromagnetic induction method for wireless charging based on the WPC standards. That is to say, the RX 101 and the TX 102 perform wireless power transmission for wireless charging based on the WPC standards between a power receiving coil of the RX 101 and a power transmitting coil of the TX 102. Note that a wireless power transmission method (a contactless power transmission method) applied to the present system is not limited to the methods defined by the WPC standards, and may be other methods such as an electromagnetic induction method, a magnetic resonance method, an electric field resonance method, a microwave method, and a method that uses laser and the like. Also, although it is assumed in the present embodiment that wireless power transmission is used in wireless charging, wireless power transmission may be performed for purposes other than wireless charging.

According to the WPC standards, the magnitude of power that is guaranteed when the RX 101 receives power from the TX 102 is defined by a value called Guaranteed Power (hereinafter referred to as "GP"). GP represents a power value that is guaranteed in relation to the output to a load (e.g., a circuit for charging and the like) of the RX 101 even if the efficiency of power transmission between the power receiving coil and the power transmitting coil has decreased due to, for example, variations in the positional relationship between the RX 101 and the TX 102. For example, in a case where GP is 5 watts, even if the efficiency of power transmission has decreased due to variations in the positional relationship between the power receiving coil and the power transmitting coil, the TX 102 controls power transmission so that 5 watts can be output to a load inside the RX 101.

The RX 101 and the TX 102 according to the present embodiment perform communication for power transmission/reception control based on the WPC standards. The WPC standards define a plurality of phases including a Power Transfer phase in which power transmission is executed, and phases prior to the execution of power transmission, and communication for power transmission/reception control is performed in each phase. The phases prior to power transmission include a Selection phase, a Ping phase, an Identification and Configuration phase, a Negotiation phase, and a Calibration phase. Note that the Identification and Configuration phase is hereinafter referred to as an I&C phase.

In the Selection phase, the TX 102 transmits an Analog Ping in an intermittent and repeated manner, and detects that an object has been placed on the charging stand 103 (e.g., the RX 101, a conductor strip, or the like has been placed on the charging stand 103). The Analog Ping is a detection signal for detecting the existence of an object. The TX 102 transmits the Analog Ping by applying a voltage or current to the power transmitting coil. When there has been a change from a state where no object is placed on the charging stand 103 to a state where an object is placed thereon, the voltage and current applied to the power transmitting coil changes. The TX 102 detects at least one of the voltage value and the current value of the power transmitting coil at the time of transmission of the Analog Ping, and determines that an object exists and makes a transition to the Ping phase in a case where the voltage value falls below a certain threshold or the current value exceeds a certain threshold.

In the Ping phase, the TX 102 transmits a Digital Ping, which is higher in power than an Analog Ping. The magnitude of the Digital Ping is power that is sufficient to activate a control unit of the RX 101 placed on the charging stand 103. The RX 101 notifies the TX 102 of the magnitude of the received voltage. That is to say, the RX 101 transmits a Signal Strength packet (hereinafter referred to as an "SS packet") to the TX 102. The TX 102 recognizes that the object detected in the Selection phase is the RX 101 by receiving a response from the RX 101 that has received the Digital Ping transmitted by itself. Upon receiving the notification about the received voltage value, the TX 102 makes a transition to the I&C phase.

In the I&C phase, the TX 102 identifies the RX 101, and acquires device configuration information (capability information) from the RX 101. Thus, the RX 101 transmits an ID Packet and a Configuration Packet to the TX 102. The ID Packet includes identification information of the RX 101, and the Configuration Packet includes the device configuration information (capability information) of the RX 101. The TX 102 that has received the ID Packet and the Configuration Packet from the RX 101 makes a response by transmitting an acknowledgement (ACK) to the RX 101. Then, the I&C phase ends. Once the I&C phase has ended, the TX 102 makes a transition to the Negotiation phase. In the Negotiation phase, the value of GP is determined based on, for example, the value of GP requested by the RX 101 and the power transmission capability of the TX 102. Once the Negotiation phase has ended, the TX 102 makes a transmission to the Calibration phase.

In the Calibration phase, the RX 101 notifies the TX 102 of the received power with use of a Received Power Packet. At this time, a notification about at least two different received powers is provided. For example, a notification about the received power in a state where a load is not connected, as well as the received power in a state where a load is connected and power close to GP is received, is provided. The TX 102 acquires its own transmitted powers corresponding to the two received powers, derives power losses from the differences between the notified received powers and the acquired transmitted powers, and stores the power losses in association with the received powers. In this way, the pairs of the received power and the power loss are stored in the TX 102 in relation to at least two states of the RX 101. In the following Power Transfer phase (described later), the TX 102 executes foreign object detection processing while using the pairs of the received power and the power loss that have been stored in the foregoing manner as parameters.

A description is now given of a method of executing the foreign object detection processing in the TX 102 while using the two pairs of the received power and the power loss as parameters. For example, the TX 102 stores the two pairs of the received power and the power loss via communication in the Calibration phase. Assume these as (received power=RP1, power loss=PL1), and (received power=RP2, power loss=PL2). In executing the foreign object detection processing in the Power Transfer phase, the TX 102 first acquires the current received power=$P_{received}$ from the RX 101. Subsequently, the TX 102 derives an expected value $PL_{cal}$ of the power loss at this time through linear complementation between the two points (RP1, PL1) and (RP2, PL2). Note, it is assumed that RP1<RP2. For example, the expected value $PL_{cal}$ of the power loss can be derived using the following expression 1.

$$PL_{cal}=(PL2-PL1)/(RP2-RP1)(P_{received}-RP1)+PL1 \quad \text{[Expression 1]}$$

Using the following expression 2, the current power loss PL can be derived from the current transmitted power $P_{transmitted}$ in the TX 102 and the received power=$P_{received}$ notified from the RX 101. In a case where the current power loss PL exceeds the expected value $PL_{cal}$ by a predetermined value or more, the TX 102 determines that the power loss has increased as a result of consumption of power by a foreign object value, that is to say, a foreign object has been detected.

$$PL=P_{transmitted}-P_{received} \quad \text{[Expression 2]}$$

According to the foregoing method, the expected value of the current power loss is derived through linear complementation while using the values of power losses that have been acquired in advance as parameters. This is expressed as calibration of power losses. Note that the targets of calibration may be received powers of the RX 101, or may be transmitted powers of the TX 102, in place of power losses of the RX 101. Also, the method of deriving the expected value of the power loss, that is to say, the method of performing calibration is not limited to linear complementation, and may be, for example, nonlinear complementation that uses a power series and the like. Furthermore, information of three pairs or more (e.g., pairs of received power and transmitted power) may be used as parameters. An example in which information of three pairs or more is used as parameters is linear complementation of a polygonal line connecting (RP1, PL1) and (RP2, PL2), and (RP2, PL2) and (RP3, PL3). It is assumed here that (RP3, PL3) is information of the third pair of received power and power loss, and RP2<RP3.

In the Power Transfer phase, control for starting and continuing power transmission, stopping power transmission due to detection of a foreign object or a fully charged state, and the like is performed. In the present embodiment, processing for changing GP to a higher value, changing of the output voltage to a load of the power receiving apparatus, and processing for requesting reacquisition and addition of parameters for foreign object detection, are further executed in the Power Transfer phase. The details of such processing will be described later.

The TX 102 and the RX 101 perform the foregoing communication for power transmission/reception control, which is based on the WPC standards, by way of communication in which signals are superimposed on transmitted power with use of the same antennas (coils) as wireless power transmission. Note that the TX 102 and the RX 101 may perform communication for power transmission/reception control with use of antennas (coils) different from those for wireless power transmission. One example of communication that uses antennas (coils) different from those for wireless power transmission is a communication method that complies with the Bluetooth® Low Energy standard. Also, the communication may be performed using other communication methods such as a wireless LAN of the IEEE 802.11 standard series (e.g., Wi-Fi®), ZigBee, and NFC (Near Field Communication). Communication that uses antennas (coils) different from those for wireless power transmission may be performed at frequencies different from frequencies used in wireless power transmission.

(Apparatus Configurations)

Subsequently, a description is given of the configurations of the power receiving apparatus 101 (RX 101) and the power transmitting apparatus 102 (TX 102) according to the present embodiment. Note that the configurations described below are merely examples; a part (or all, depending on circumstances) of the described configurations may be replaced with other configurations that achieve other similar functions, or omitted, and further configurations may be added to the configurations described below. Furthermore, one hardware block mentioned in the following description may be divided into a plurality of blocks, and a plurality of blocks may be integrated into one block.

Figure 2:
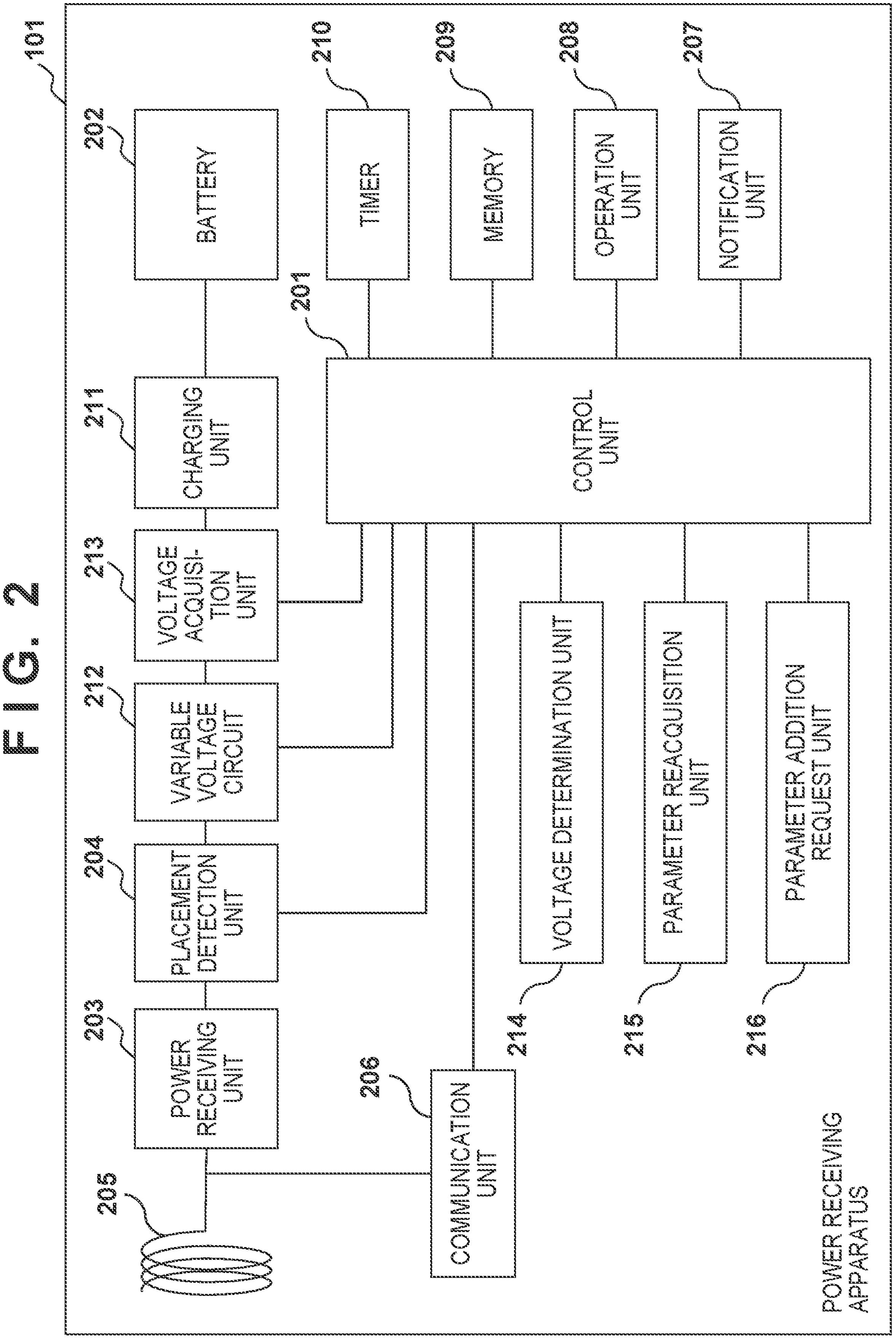
FIG. 2 is a block diagram showing an exemplary configuration of a power receiving apparatus according to a first embodiment.

FIG. 2 is a diagram showing an exemplary configuration of the RX 101 according to the present embodiment. The RX 101 includes a control unit 201, a battery 202, a power receiving unit 203, a placement detection unit 204, a power receiving coil 205, a communication unit 206, a notification unit 207, an operation unit 208, a memory 209, and a timer 210. The RX 101 also includes a charging unit 211, a variable voltage circuit 212, a voltage acquisition unit 213, a voltage determination unit 214, a parameter reacquisition unit 215, and a parameter addition request unit 216.

The control unit 201 controls the entirety of the RX 101 by executing a control program stored in, for example, the memory 209. That is to say, the control unit 201 controls each function unit shown in FIG. 2. Also, the control unit 201 performs control related to power reception control in the RX 101. The control unit 201 may further perform control for executing applications other than wireless power transmission. The control unit 201 is configured to include one or more processors, such as CPUs (Central Processing Units), MPUs (Micro Processing Units), and the like. Note that the control unit 201 may be composed of hardware dedicated to specific processing, such as an Application Specific Integrated Circuit (ASIC). Also, the control unit 201 may be configured to include an array circuit compiled to execute predetermined processing, such as an FPGA (Field Programmable Gate Array). The control unit 201 stores, in the memory 209, information to be stored during the execution of various types of processing. Furthermore, the control unit 201 can measure a time period with use of the timer 210.

The battery 202 supplies, to the entirety of the RX 101, power necessary for the control unit 201 to control each unit of the RX 101, and for power reception and communication. Also, the battery 202 stores power received via the power receiving coil 205.

In the power receiving coil 205, an induced electromotive force is generated by electromagnetic waves emitted from the power transmitting coil of the TX 102. The power receiving unit 203 acquires power generated in the power receiving coil 205. The power receiving unit 203 acquires alternating-current power generated by electromagnetic induction in the power receiving coil 205, converts the alternating-current power into direct-current power or alternating-current power of a predetermined frequency, and outputs the power to the charging unit 211 that performs processing for charging the battery 202. That is to say, the power receiving unit 203 supplies power to a load in the RX 101, and the charging unit 211 and the battery 202 are examples of such a load. The above-described GP is guaranteed power that is guaranteed to be output from the power receiving unit 203 to a load. Furthermore, the power receiving unit 203 notifies the control unit 201 of the current received power. In this way, at any timing, the control unit 201 can learn received power of this timing. Note that it is permissible to adopt a configuration in which an entity other than the power receiving unit 203 measures received power and notifies the control unit 201 of received power.

The placement detection unit 204 detects that the RX 101 is placed on the charging stand 103 based on the WPC standards. The placement detection unit 204 detects, for example, at least one of the voltage value and the current value of the power receiving coil 205 at the time when the power receiving unit 203 received a Digital Ping of the WPC standards via the power receiving coil 205. The placement detection unit 204 determines that the RX 101 is placed on the charging stand 103, for example, in a case where the voltage value falls below a predetermined voltage threshold or in a case where the current value exceeds a predetermined current threshold.

The communication unit 206 performs the aforementioned control communication based on the WPC standards with the TX 102. The communication unit 206 performs communication with the TX 102 by acquiring information transmitted from the TX 102 by way of demodulation of electromagnetic waves input from the power receiving coil 205, and by superimposing information to be transmitted to the TX 102 on electromagnetic waves by way of load modulation of the input electromagnetic waves. That is to say, the communication unit 206 performs communication by way of superimposition on electromagnetic waves transmitted from the power transmitting coil of the TX 102.

The notification unit 207 notifies a user of information with use of any visual, auditory, or haptic method, for example. The notification unit 207 notifies the user of, for example, a charge state of the RX 101, and a state related to power transmission of the wireless power transmission system including the TX 102 and the RX 101 shown in FIG. 1. The notification unit 207 is configured to include, for example, a liquid crystal display, an LED, a speaker, a vibration generation circuit, and other notification devices. The operation unit 208 has an acceptance function for accepting an operation that has been performed by the user with respect to the RX 101. The operation unit 208 is configured to include, for example, buttons, a keyboard, a sound input device such as a microphone, a motion detection device such as an acceleration sensor and a gyroscope, or other input devices. Note that a device in which the notification unit 207 and the operation unit 208 are integrated, such as a touchscreen, may be used. As stated earlier, the memory 209 stores various types of information such as identification information and device configuration information, a control program, and the like. Note that the memory 209 may store information that has been acquired by a function unit different from the control unit 201. The timer 210 measures time with use of, for example, a count-up timer that measures a time period elapsed since the time of activation, a count-down timer that counts down from a set time, and the like.

The charging unit 211 charges the battery 202 with use of power supplied from the power receiving unit 203. Also, under control of the control unit 201, the charging unit 211 starts or stops charging of the battery 202, and further adjusts power used in charging of the battery 202 based on the charge state of the battery 202. When power used by the charging unit 211 has changed, power supplied from the power receiving unit 203, that is to say, received power in the RX 101, also changes accordingly. As stated earlier, the charging unit 211 is a load in the RX 101. Note that the charging unit 211 and the battery 202 may exist as other devices outside the RX 101. These devices may be, for example, devices that operate on power supplied based on the USB PD standard. In this case, the control unit 201 may acquire, from the charging unit 211, information of the magnitude of power necessitated by the charging unit 211 via communication of the USB PD standard.

Under control of the control unit 201, the variable voltage circuit 212 sets an output voltage for supplying power from the power receiving unit 203 to the charging unit 211, that is to say, a load. The voltage acquisition unit 213 acquires the voltage output to the charging unit 211. This voltage value can be read by the control unit 201 at any timing. The voltage determination unit 214 determines the voltage to be set on the variable voltage circuit 212.

Using the communication unit 206, the parameter reacquisition unit 215 requests that the TX 102 reacquire parameters for foreign object detection processing. Parameters for foreign object detection processing denote pairs of received power and a power loss, which have been mentioned in the earlier description the Calibration phase. Using the communication unit 206, the parameter addition request unit 216 requests that the TX 102 add parameters for foreign object detection processing. This is, for example, a request to add and store the third pair in a case where two pairs have already been held in the TX 102. Note that the voltage determination unit 214, the parameter reacquisition unit 215, and the parameter addition request unit 216 may be configured to entirely or partially operate on a processor different from that of the control unit 201, and may be implemented by a program that operates on the control unit 201. The voltage determination unit 214, the parameter reacquisition unit 215, and the parameter addition request unit 216 can be realized by the control unit 201 executing a program stored in, for example, the memory 209.

Figure 3:
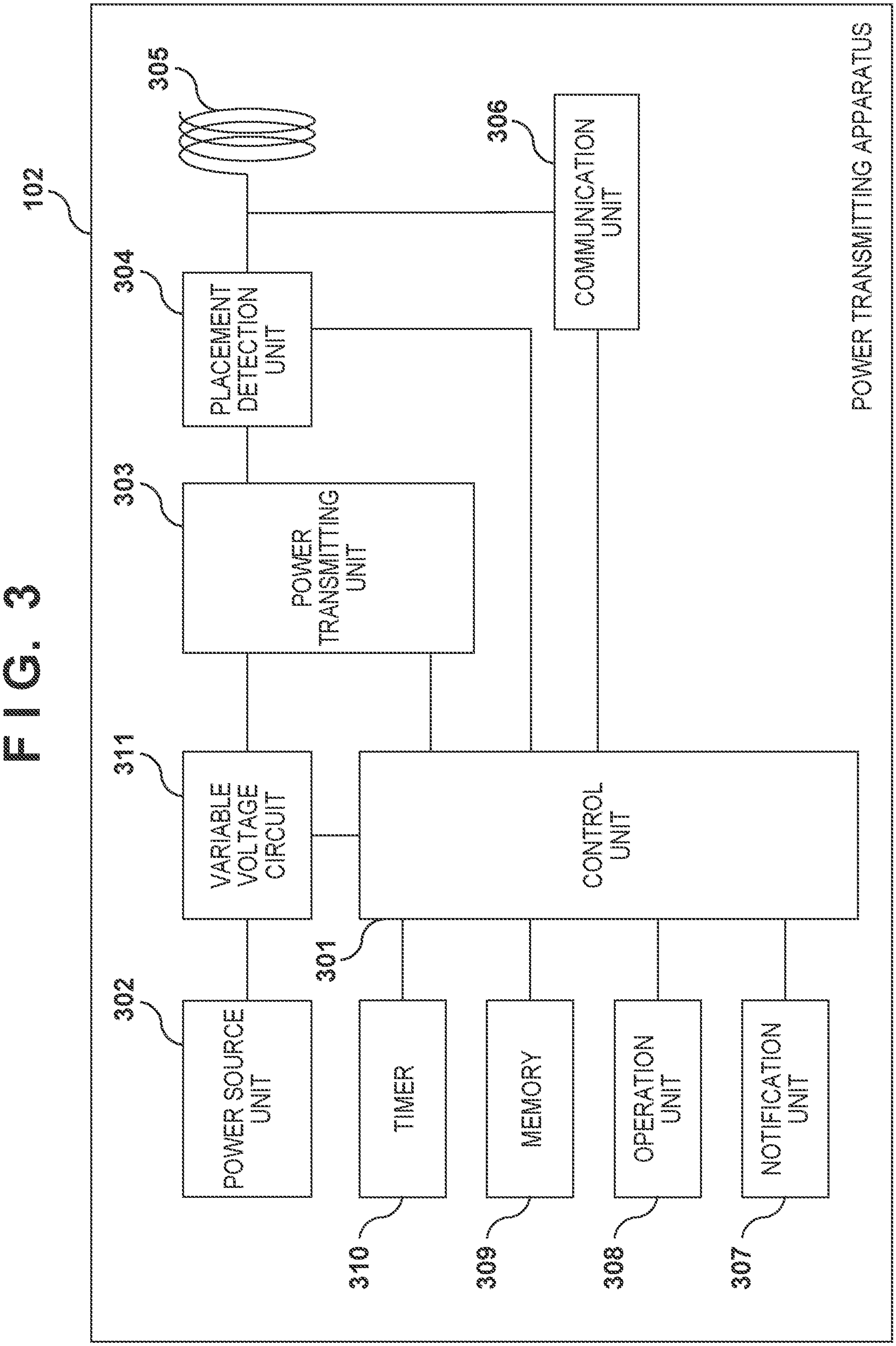
FIG. 3 is a block diagram showing an exemplary configuration of a power transmitting apparatus according to the first embodiment.

FIG. 3 is a diagram showing an exemplary configuration of the TX 102 according to the present embodiment. In one example, the TX 102 includes a control unit 301, a power source unit 302, a power transmitting unit 303, a placement detection unit 304, a power transmitting coil 305, a communication unit 306, a notification unit 307, an operation unit 308, a memory 309, a timer 310, and a variable voltage circuit 311.

The control unit 301 controls the entirety of the TX 102 by executing a control program stored in, for example, the memory 309. That is to say, the control unit 301 controls each function unit shown in FIG. 3. Also, the control unit 301 performs control related to power transmission control in the TX 102. The control unit 301 may further perform control for executing applications other than wireless power transmission. The control unit 301 is configured to include one or more processors, such as CPUs, MPUs, and the like. Note that the control unit 301 may be configured to include hardware dedicated to specific processing, such as an Application Specific Integrated Circuit (ASIC), or an array circuit compiled to execute predetermined processing, such as an FPGA. The control unit 301 stores, in the memory 309, information to be stored during the execution of various types of processing. Furthermore, the control unit 301 can measure a time period with use of the timer 310.

The power source unit 302 supplies, to the entirety of the TX 102, power necessary for the control unit 301 to control the TX 102, and for power transmission and communication. The power source unit 302 is, for example, a commercial power source or a battery. The battery stores power supplied from a commercial power source.

The power transmitting unit 303 converts direct-current or alternating-current power input from the power source unit 302 into alternating-current frequency power of a frequency band used in wireless power transmission, and inputs this alternating-current frequency power to the power transmitting coil 305; as a result, electromagnetic waves for causing the RX 101 to receive power are generated. Note that the frequency of alternating-current power generated by the power transmitting unit 303 is, for example, approximately several hundred kHz (e.g., 110 kHz to 205 kHz). Based on an instruction from the control unit 301, the power transmitting unit 303 inputs alternating-current frequency power to the power transmitting coil 305 so as to cause the power transmitting coil 305 to output electromagnetic waves for transmitting power to the RX 101. Also, the power transmitting unit 303 controls the intensity of electromagnetic waves to be output by adjusting one or both of the voltage (power transmission voltage) and the current (power transmission current) to be input to the power transmitting coil 305. Increasing the power transmission voltage or the power transmission current enhances the intensity of electromagnetic waves, whereas reducing the power transmission voltage or the power transmission current weakens the intensity of electromagnetic waves. Furthermore, based on an instruction from the control unit 301, the power transmitting unit 303 performs output control with respect to the alternating-current frequency power so that power transmission from the power transmitting coil 305 is started or stopped. In addition, the power transmitting unit 303 notifies the control unit 301 of the current transmitted power. In this way, at any timing, the control unit 301 can learn transmitted power of that timing. Note that it is permissible to adopt a configuration in which an entity other than the power transmitting unit 303 measures transmitted power and provides a notification to the control unit 301.

The placement detection unit 304 detects whether an object is placed on the charging stand 103 based on the WPC standards. Specifically, the placement detection unit 304 detects whether an object has been placed on an Interface Surface of the charging stand 103. The placement detection unit 304 detects at least one of the voltage value and the current value of the power transmitting coil 305 at the time when, for example, the power transmitting unit 303 transmitted an Analog Ping of the WPC standards via the power transmitting coil 305. Note that the placement detection unit 304 may detect a change in impedance. Then, the placement detection unit 304 can determine that an object is placed on the charging stand 103 in a case where the voltage value falls below a predetermined voltage value, or in a case where the current value exceeds a predetermined current value. Note that whether this object is the power receiving apparatus or another foreign object is determined based on whether there is a predetermined response to a Digital Ping that is subsequently transmitted by the communication unit 306. That is to say, in a case where the TX 102 has received the predetermined response, this object is determined to be the power receiving apparatus (RX 101); otherwise, this object is determined to be an object different from the power receiving apparatus.

The communication unit 306 performs the aforementioned control communication based on the WPC standards with the RX 101. The communication unit 306 performs communication by modulating electromagnetic waves output from the power transmitting coil 305 and transmitting information to the RX 101. Also, the communication unit 306 acquires information transmitted by the RX 101 by demodulating electromagnetic waves that have been output from the power transmitting coil 305 and modulated by the RX 101. That is to say, the communication unit 306 performs communication by way of superimposition on electromagnetic waves transmitted from the power transmitting coil 305.

The notification unit 307 notifies a user of information with use of any visual, auditory, or haptic method, for example. The notification unit 307 notifies the user of, for example, a charge state of the TX 102, and a state related to power transmission of the wireless power transmission system including the TX 102 and the RX 101 shown in FIG. 1. The notification unit 307 is configured to include, for example, a liquid crystal display, an LED, a speaker, a vibration generation circuit, and other notification devices. The operation unit 308 has an acceptance function for accepting an operation that has been performed by the user with respect to the TX 102. The operation unit 308 is configured to include, for example, buttons, a keyboard, a sound input device such as a microphone, a motion detection device such as an acceleration sensor and a gyroscope, or other input devices. Note that a device in which the notification unit 307 and the operation unit 308 are integrated, such as a touchscreen, may be used.

The memory 309 stores various types of information such as identification information and capability information, a control program, and the like. Note that the memory 309 may store information that has been acquired by a function unit different from the control unit 301. The timer 310 measures time with use of, for example, a count-up timer that measures a time period elapsed since the time of activation, a count-down timer that counts down from a set time, and the like.

Under control of the control unit 301, the variable voltage circuit 311 sets an input voltage for supplying power from the power source unit 302 to the power transmitting unit 303. Note that the power source unit 302 and the variable voltage circuit 311 may exist as other devices outside the TX 102. These devices may be power source adapters that supply power based on the USB PD standard. In this case, the control unit 301 may control the variable voltage circuit 311 via communication of the USB PD standard.

(Flow of Processing)

Subsequently, a description is given of exemplary flows of processing executed by the RX 101 and the TX 102.

[Processing in Power Receiving Apparatus]

Figure 4A:
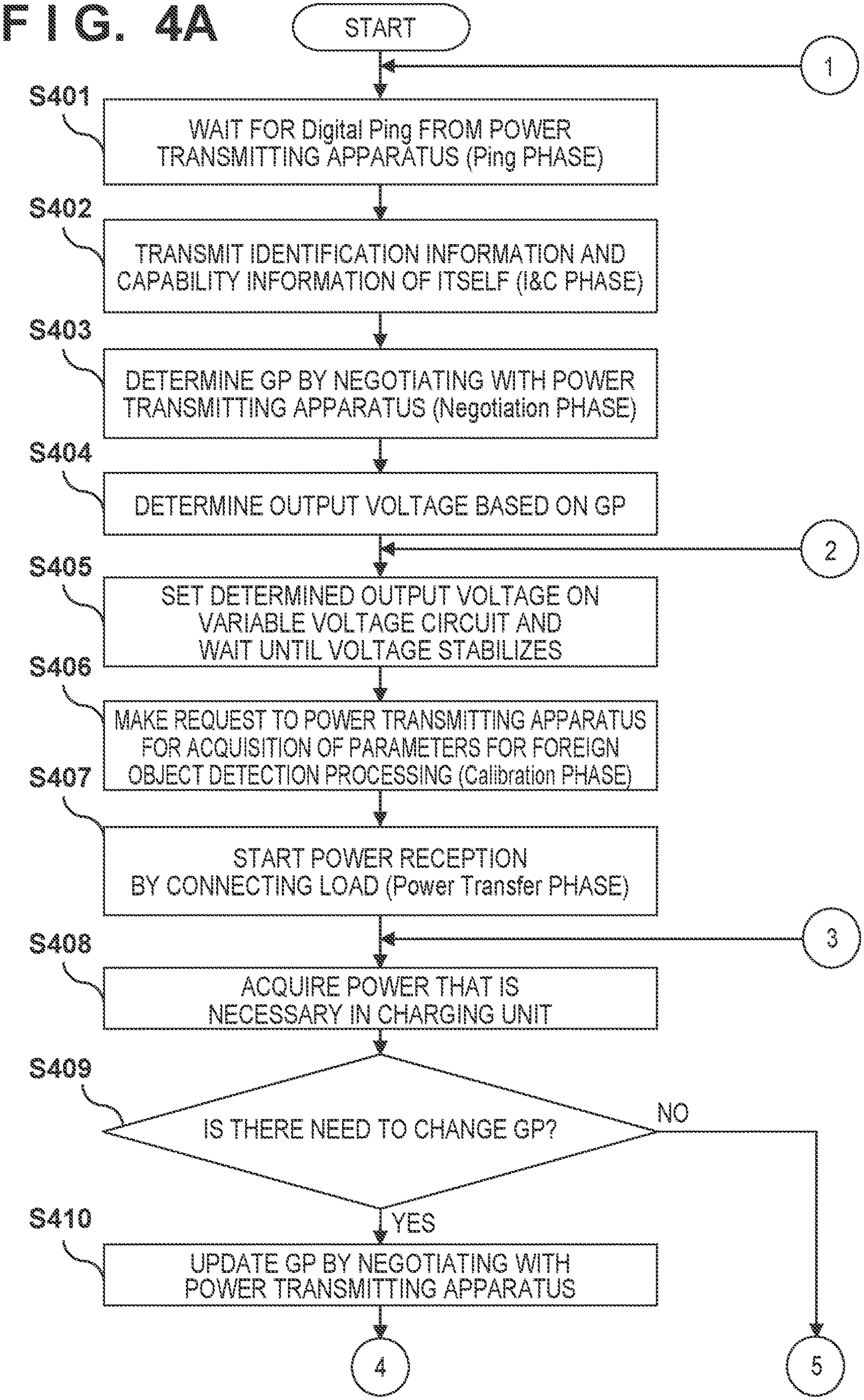
FIG. 4A is a flowchart showing an exemplary flow of processing of the power receiving apparatus according to the first embodiment.
Figure 4B:
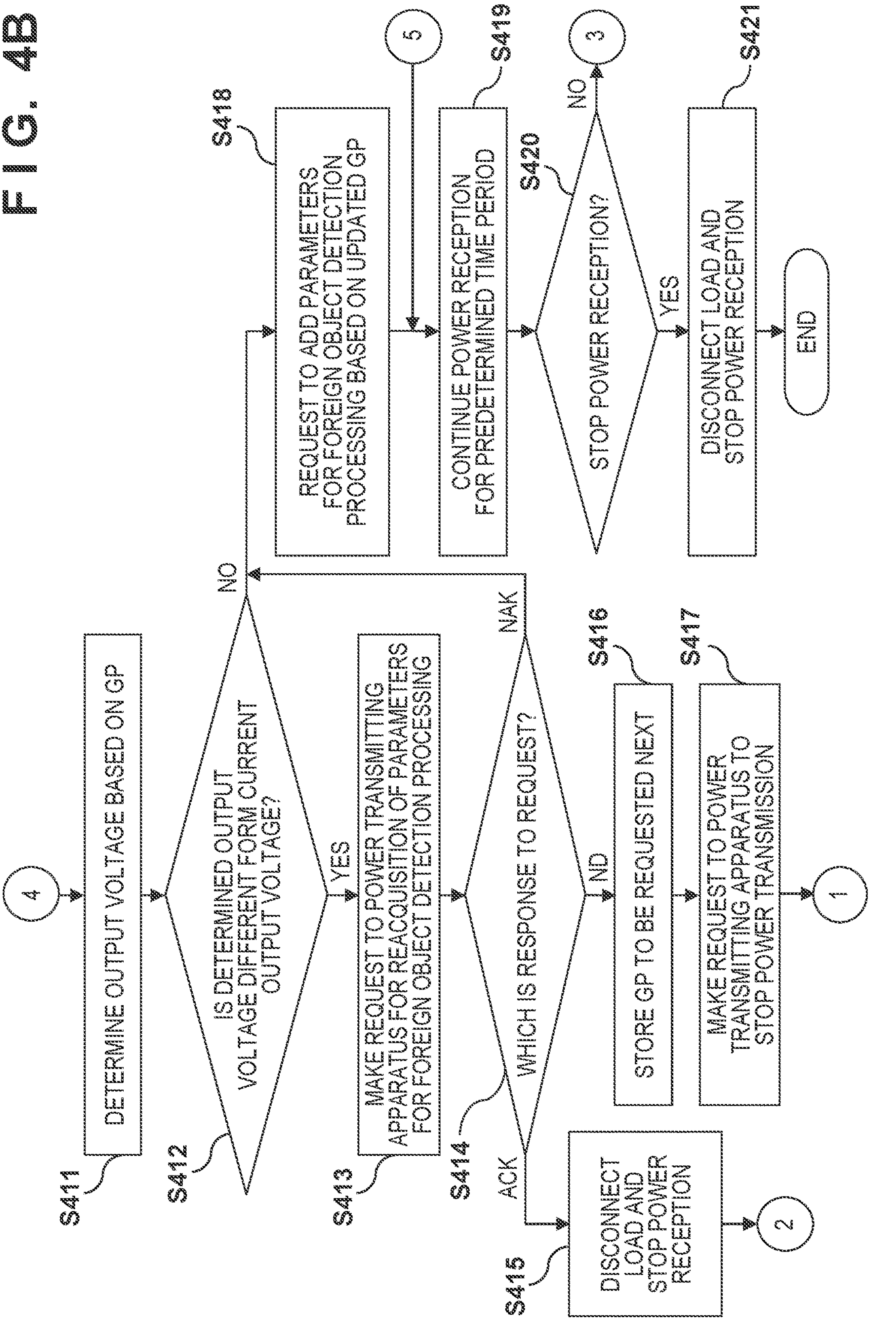
FIG. 4B is a flowchart showing an exemplary flow of processing of the power receiving apparatus according to the first embodiment.

FIG. 4A and FIG. 4B are flowcharts showing an example of processing executed by the RX 101. The present processing can be realized by, for example, the control unit 201 of the RX 101 executing a program that has been read out from the memory 209. The present processing also includes processing in the voltage determination unit 214, the parameter reacquisition unit 215, and the parameter addition request unit 216. Note that at least a part of the procedure of the present processing to be described below may be realized by hardware. In this case, the hardware can be realized by, for example, automatically generating a dedicated circuit that uses a gate array circuit, such as an FPGA, from a program for realizing each processing step with use of a predetermined compiler. Also, the present processing can be started in response to power-ON of the RX 101, in response to activation of the RX 101 caused by power supply from the battery 202 or the TX 102, or in response to an instruction for starting a wireless charging application input by a user of the RX 101. Furthermore, the present processing may also be started by another trigger.

After starting processing related to power transmission/reception, the RX 101 executes processing that is defined as the Selection phase and the Ping phase of the WPC standards, and waits for itself to be placed on the TX 102 (S401). Then, the RX 101 detects that it has been placed on the charging stand 103 of the TX 102 by, for example, detecting a Digital Ping from the TX 102. Upon detecting the Digital Ping, the RX 101 transmits an SS packet including a received voltage value to the TX 102. Upon detecting the placement of itself on the charging stand 103 of the TX 102, the RX 101 executes processing that is defined as the I&C phase of the WPC standards and transmits identification information and device configuration information (capability information) to the TX 102 with use of the communication unit 206 (S402).

Figure 7:
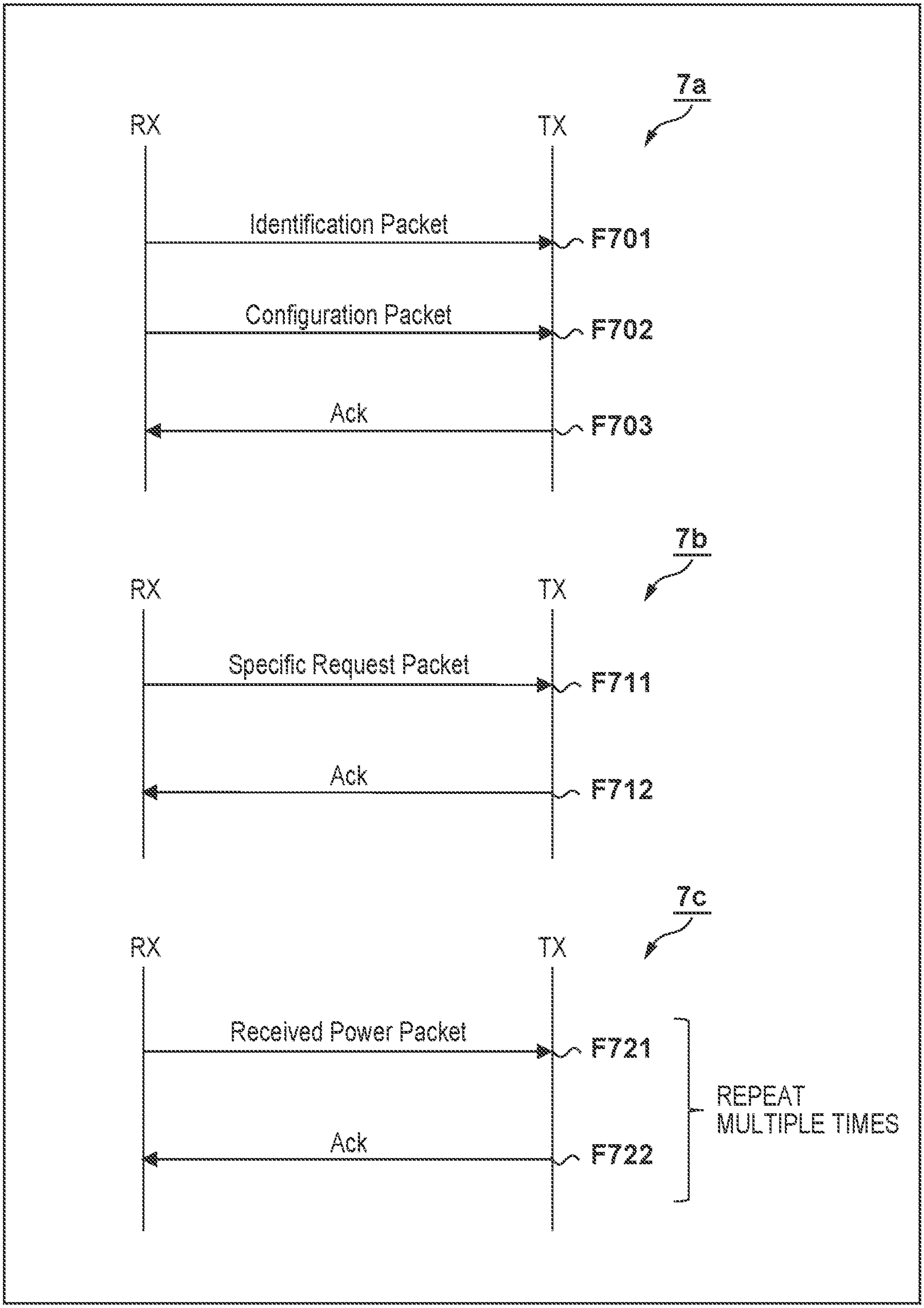
FIG. 7 is a diagram showing a communication sequence in an I&C phase (7*a*), a communication sequence in a Negotiation phase (7*b*), and a communication sequence in a Calibration phase (7*c*).

In FIG. 7, 7*a* depicts a flow of communication in the I&C phase. In the I&C phase, the RX 101 transmits an Identification Packet (ID Packet) to the TX 102 (F701). The ID Packet stores a Manufacturer Code and a Basic Device ID, which are identification information of the RX 101, as well as an information element that enables specification of a corresponding version of the WPC standards as capability information of the RX 101. The RX 101 further transmits a Configuration Packet to the TX 102 (F702). The Configuration Packet includes the following information as capability information of the RX 101. Specifically, it includes a Maximum Power Value, which is a value that specifies the maximum power that the RX 101 can supply to a load, and information indicating whether a Negotiation function of the WPC standards is provided.

Once the TX 102 has received these packets, it transmits an ACK (F703), and the I&C phase ends. Note that the RX 101 may notify the TX 102 of the identification information and the device configuration information (capability information) of the RX 101 using a method other than communication in the I&C phase of the WPC standards. Also, the identification information of the RX 101 may be a Wireless Power ID of the WPC standards, or may be any other identification information that enables identification of the individuality of the RX 101. Information other than the ones described above may be included as the capability information.

Returning to FIG. 4A, the RX 101 negotiates with the TX 102 and determines GP by way of communication in the Negotiation phase (S403). In FIG. 7, 7*b* depicts one example of a flow of the Negotiation phase. GP is determined based on a Specific Request Packet from the RX 101, and on a response thereto from the TX 102. First, the RX 101 notifies the TX 102 of the value of requested GP by transmitting a Specific Request Packet thereto (F711). The RX 101 determines the value of requested GP based on the power necessitated by itself. It is assumed that this value is stored in the memory 209 in advance. An example of the value of GP is 5 watts.

The TX 102 determines whether to accept the request from the RX 101 based on the power transmission capability of itself, and transmits an ACK (affirmation response) to the RX 101 in a case where the request is to be accepted, and a NAK (negation response) thereto in a case where the request is not to be accepted. Note that 7*b* of FIG. 7 depicts an example in which the TX 102 transmits an ACK (F712). In a case where the TX 102 has transmitted an ACK, the value of GP is determined to be the same as the value requested by the RX 101, and is stored in the memories of both of the RX 101 and the TX 102. On the other hand, in a case where the TX 102 has transmitted a NAK, the value of GP is a small default value, for example, a value equal to or smaller than 5 watts. In one example, the default value is stored in the memories of both of the RX 101 and the TX 102 in advance. Note that the foregoing method of determining GP is one example, and GP may be determined using another method.

Returning to FIG. 4A, based on GP determined in S403, the RX 101 determines the output voltage for supplying power from the power receiving unit 203 to the charging unit 211 (S404). Note that in a case where there is an output voltage that has already been stored in S404, this stored output voltage is used as the output voltage for supplying power from the power receiving unit 203 to the charging unit 211, irrespective of the determined GP. Table 1001 of FIG. 10 shows examples of the output voltage determined based on GP. With reference to table 1001, for example, the output voltage for a case where GP is 5 watts can be determined to be 5 volts, the output voltage for a case where GP is 15 watts can be determined to be 9 volts, and so on. Here, each value of table 1001 is a value that has been determined in advance, based on the electrical properties of the charging unit 211 of the RX 101, in order to efficiently charge the battery 202. Table 1001 is held in, for example, the memory 209. Note that in a case where the charging unit 211 is an external device that operates based on the USB PD standard, the power receiving unit 203 may acquire the output voltage from the charging unit 211 via communication, or the output voltage may be held in the memory 209 as a table prescribed by the USB PD standard.

Returning to FIG. 4A, the RX 101 sets the output voltage determined in S404 on the variable voltage circuit 212, and waits until the voltage that is actually output stabilizes (S405). Subsequently, the RX 101 requests that the TX 102 implement the aforementioned Calibration phase by making a request to the TX 102 for acquisition of parameters for foreign object detection processing (S406). Note that the waiting until stabilization of the output voltage in S405 makes it possible to implement processing of the Calibration phase in a state where the output voltage has stabilized in S406. As a result, the acquired parameters for foreign object detection processing are not influenced by temporal variations in the output voltage, and more accurate foreign object detection can be performed.

In FIG. 7, 7*c* depicts a flow of processing of the Calibration phase. The RX 101 transmits a Received Power Packet via the communication unit 206 (F721). The Received Power Packet includes a Received Power Value, which is the current received power. It also includes information indicating Mode=1, which denotes the start of the Calibration phase. The TX 102 stores information of the received power included in the Received Power Packet as parameters for foreign object detection processing, and then returns an ACK (F722). Also, the TX 102 detects the start of the Calibration phase by detecting Mode=1, and in a case where there are parameters for foreign object detection processing that have already been stored until then, these parameters are discarded. The details of other processing in the TX 102 will be described later.

In the Calibration phase, the RX 101 gives notification of received powers in two different states: a state where a load is not connected, that is to say, a state close to 0 watts, and a state where power close to GP is being received. That is to say, communication of the Received Power Packet and the ACK depicted in 7*c* of FIG. 7 takes place at least twice, and information of two received powers is stored in the TX 102. Also, in a case where the value of GP exceeds 5 watts, the RX 101 gives notification of received power at a voltage value interval of approximately 5 watts. For example, in a case where the value of GP is 15 watts, the notification of received power is provided in the states where powers of approximately 0 watts, approximately 5 watts, approximately 10 watts, and approximately 15 watts are being received. Note that the voltage value interval at which the RX 101 gives notification of received power may not be 5 watts, and may not be constant. The TX 102 stores all of the received powers of which it was notified by the RX 101 as parameters for foreign object detection processing.

Returning to FIG. 4A, the RX 101 connects the charging unit 211, which is a load, to the power receiving unit 203, and starts power reception in the Power Transfer phase (S407). After starting the power reception, the RX 101 acquires power that is necessary in the charging unit 211 (S408). This value may be held in the memory 209 in advance, or may be acquired from an external device via communication in a case where the charging unit 211 is that external device. If the power necessary in the charging unit 211 falls within the range of current GP, the RX 101 determines that there is no need to change GP (NO of S409), and continues the power reception for a predetermined time period (S419). The predetermined time period is, for example, one second. Thereafter, if charging of the battery 202 by the charging unit 211 has been completed (YES of S420), the RX 101 disconnects the load and stops the power reception. If charging has not been completed (NO of S420), processing returns to S408 to continue charging.

Here, while the power reception is continued in S419, the RX 101 repeatedly and regularly notifies the TX 102 of the current received power. The TX 102 detects a foreign object based on the received power of which it was notified by the RX 101. A Received Power Packet is used in giving notification of the current received power. As stated earlier, a Received Power Packet is also used in giving notification of parameters for foreign object detection processing. For this reason, the RX 101 adds information for distinguishing whether it is a notification about parameters for foreign object detection processing, that is to say, a notification that requests that the TX 102 store the same, or a notification about the current received power for executing foreign object detection processing in the TX 102. This information is stored in, for example, a Mode value of a Received Power Packet. In the present embodiment, Mode=0 means a notification of received power for foreign object detection processing. In a case where the TX 102 is requested to store the parameters, a value other than 0 is set as the Mode value. For example, in the aforementioned Calibration phase, 1 is set as the Mode value of the Received Power Packet.

In a case where the acquisition of power necessary in the charging unit 211 (S408) has resulted in the need to change GP (YES of S409), the RX 101 negotiates with the TX 102 and changes GP (S410). Here, in a case where GP is to be changed to a predetermined magnitude or higher, the RX 101 may perform device authentication with respect to the TX 102 via communication. By performing device authentication, power of a predetermined magnitude or higher can be received only from the TX 102 that is guaranteed to satisfy conditions of the WPC standards and the like. One example of device authentication is challenge-response communication that uses an electronic certificate.

Subsequently, the RX 101 determines the output voltage to the charging unit 211 based on the updated GP (S411). The output voltage to the charging unit 211 is determined based on table 1001 of FIG. 10. Thereafter, the RX 101 compares the output voltage determined in S411 with the current output voltage (S412). In a case where the determined output voltage and the current output voltage are the same as a result of comparison (NO of S412), the TX 102 is requested to add parameters for foreign object detection processing (S418). This request is made by transmitting a Received Power Packet after placing the received power in a state where its value is close to the updated GP. It is assumed here that Mode=2 is used as the Mode value other than 0. For example, in a case where GP is changed from 5 watts to 10 watts, the RX 101 transmits a Received Power Packet (Mode=2) after setting the received power at approximately 10 watts. Note that in a case where GP is to be reduced, the request for addition need not be transmitted. Also, in a case where the updated GP is extremely high (in a case where the difference from the current GP is larger than a predetermined value), the Received Power Packet may be transmitted multiple times in the states of multiple received powers at an interval of, for example, approximately 5 watts.

The TX 102 adds and holds information of the received power of which it was notified in S418, as parameters for foreign object detection processing, to and in the memory 309. It is assumed that, in order to distinguish from the start of the Calibration phase and a notification about received power, the Mode value of a Received Power Packet for requesting the addition of parameters for foreign object detection processing is a value other than 0 and 1. As stated earlier, Mode=2 is used in the present embodiment. Thereafter, processing proceeds to S419. Processing of S419 onward is as described earlier.

On the other hand, in a case where the output voltage determined in S411 and the current output voltage differ from each other (YES of S412), the TX 102 is requested for reacquisition of parameters for foreign object detection processing with use of the communication unit 206 (S413), and a response from the TX 102 is waited for. This request for reacquisition is different from the aforementioned request for addition of parameters for foreign object detection processing in S418. That is to say, the request for reacquisition is a request for the TX 102 to discard parameters for foreign object detection processing held in the memory 309 and store parameters for foreign object detection processing that are newly notified by the RX 101.

This request for reacquisition may be made by transmitting a packet of the WPC standards, or may be made by transmitting another packet that can be recognized by the TX 102. According to the WPC standards, a response from the TX 102 is one of an ACK (Acknowledge), an ND (Not Defined), and a NAK (Not-Acknowledge). The ACK is an affirmation response indicating that the TX 102 has accepted the request for reacquisition. The ND is a response indicating that the packet is undefined, that is to say, the TX 102 does not have a function of accepting the request for reacquisition. Also, the NAK is a negation response indicating that the request for reacquisition is rejected. In a case where the response from the TX 102 is the affirmation response (ACK) (ACK in S414), the RX 101 returns to S405 after disconnecting the load and stopping the power reception (S415). In S405, which is the return destination, the RX 101 sets the output voltage determined in S411 on the variable voltage circuit 212. Then, in S406, the RX 101 executes processing of the Calibration phase with use of this output voltage that has been set. Processing of S406 onward is as described earlier. Note that in S412, the determination of whether the determined output voltage is the same as or different from the current output voltage may be replaced with the determination of whether the difference between the determined output voltage and the current output voltage is larger than a predetermined threshold or is equal to or smaller than the predetermined threshold. Here, the threshold≥0. Furthermore, this threshold may be determined based on the magnitude of the output voltage determined in S411. For example, it may have a value that increases as the output voltage determined in S411 increases. Also, for example, 10% of the magnitude of the output voltage determined in S411 may be set as the threshold.

On the other hand, in a case where the response from the TX 102 indicates undefined (ND) (ND of S414), the RX 101 stores the value of the GP updated in S410 in the memory 209 (S416), and then requests that the TX 102 stop power transmission (S417). Thereafter, processing returns to S401, and the RX 101 waits for a Digital Ping. The request for stopping power transmission is made by, for example, the RX 101 transmitting an End Power Transfer Packet of the WPC standards to the TX 102. Note that a request for restricting the transmitted power to a small value equal to or smaller than a predetermined value may be used in place of the request for stopping power transmission. Once processing has returned to S401, S401 and S402 are executed immediately because the placed state is ongoing, and the RX 101 negotiates with the TX 102 so that the GP updated in S410 is set in S403. As a result, the output voltage from the variable voltage circuit 212 is the output voltage determined in S411 (S404), and processing of the Calibration phase is executed (S406) in a state where this output voltage has stabilized (S405). As stated earlier, in the Calibration phase, parameters for foreign object detection processing that have already been stored in the TX 102 are discarded, and then Received Power Packets (Mode=1) are issued in the states of received powers at an interval of 5 watts, starting with 0 watts. The TX 102 newly stores the received powers of which it is notified via these Received Power Packets as parameters for foreign object detection processing. Subsequent processing is as described earlier.

As described above, even in a case where a response from the TX 102 to a request from the RX 101 for reacquisition of parameters is an ND, the RX 101 and the TX 102 reacquire parameters for foreign object detection processing. Therefore, even in a case where the response in S414 is the ND because the TX 102 does not support a request for reacquisition of parameters for foreign object detection processing, parameters for foreign object detection processing can be reacquired in the state of the output voltage determined in S411.

In a case where the response from the TX 102 is a NAK in S414 (NAK of S414), the RX 101 makes a request for addition of parameters for foreign object detection processing based on the GP updated in S410 (S418). In this case, the output voltage does not change. In this way, the output voltage can remain unchanged in a case where the TX 102 has rejected a change in the output voltage.

[Processing in Power Transmitting Apparatus 102]

Subsequently, a description is given of an exemplary flow of processing executed by the TX 102 with use of FIG. 5A and FIG. 5B. The present processing can be realized by, for example, the control unit 301 of the TX 102 executing a program that has been read out from the memory 309. Note that at least a part of the following procedure may be realized by hardware. In this case, the hardware can be realized by, for example, automatically generating a dedicated circuit that uses a gate array circuit, such as an FPGA, from a program for realizing each processing step with use of a predetermined compiler. Also, the present processing can be executed in response to power-ON of the TX 102, in response to an instruction for starting a wireless charging application input by a user of the TX 102, or in response to reception of power supply by the TX 102 while being connected to a commercial power source. Furthermore, the present processing may also be started by another trigger.

The TX 102 first executes processing defined as the Selection phase and the Ping phase of the WPC standards, and waits for the RX 101 to be placed (S501). Specifically, the TX 102 transmits an Analog Ping of the WPC standards in a repeated and intermittent manner, and detects whether there is an object placed on the charging stand 103. Then, in a case where the placement of an object on the charging stand 103 has been detected, the TX 102 transmits a Digital Ping. In a case where there has been a predetermined response (a Signal Strength Packet) to the Digital Ping, the TX 102 determines that the detected object is the RX 101 and the RX 101 has been placed on the charging stand 103.

Upon detecting the placement of the RX 101, the TX 102 executes communication in the aforementioned I&C phase and acquires identification information and device configuration information (capability information) from that RX 101 with use of the communication unit 306 (S502). Then, the TX 102 executes communication in the Negotiation phase with the RX 101, and determines GP based on a request from the RX 101 (S503). Specifically, this is done based on a Specific Request Packet and a response thereto depicted in 7*b* of FIG. 7, as has been described in relation to processing of the power receiving apparatus.

Figure 5A:
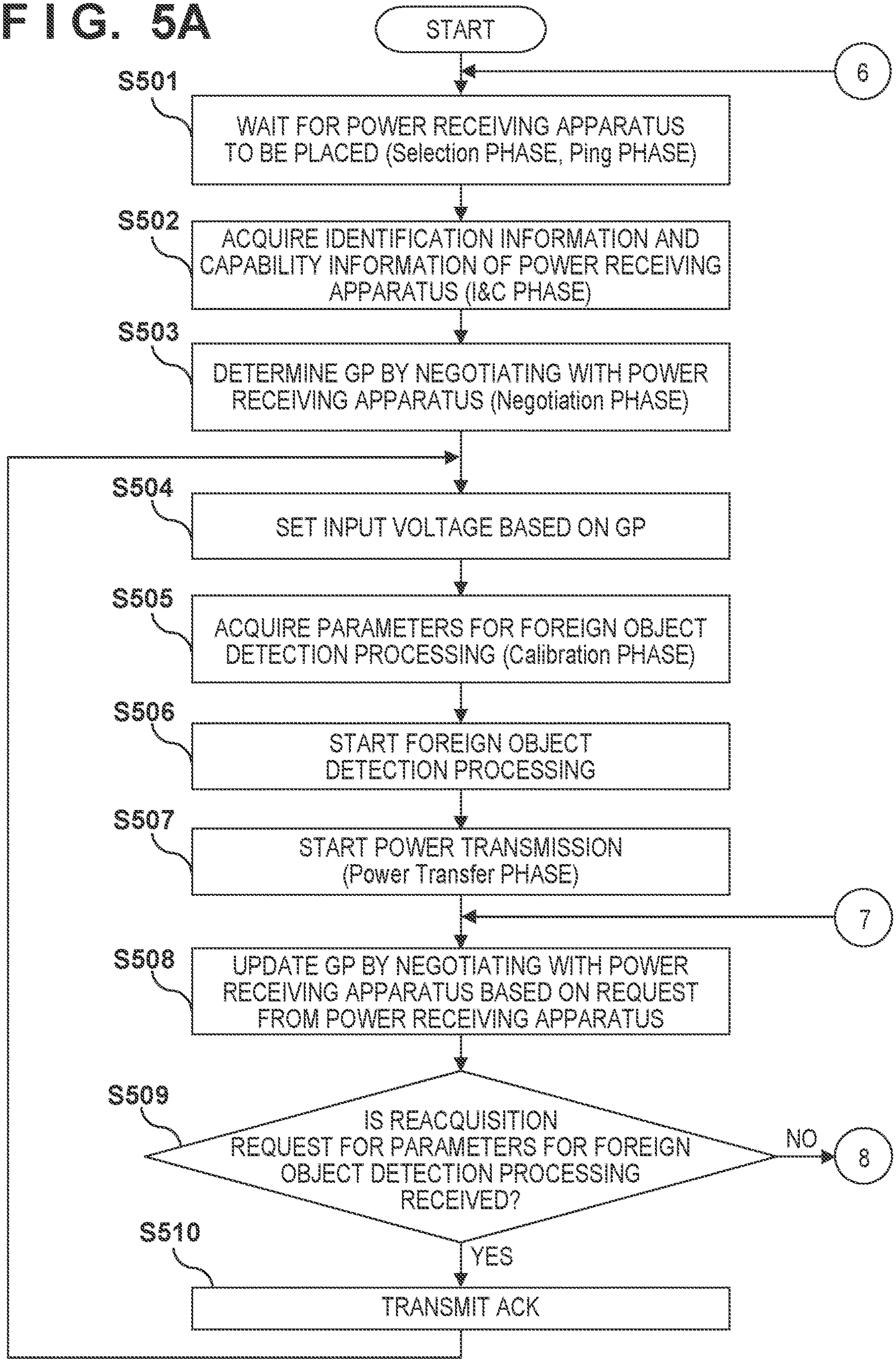
FIG. 5A is a flowchart showing an exemplary flow of processing of the power transmitting apparatus according to the first embodiment.

Retuning to FIG. 5A, the TX 102 determines an input voltage for supplying power from the power source unit 302 to the power transmitting unit 303 based on GP determined in S503, and sets the input voltage on the variable voltage circuit 311 (S504). Table 1002 of FIG. 10 shows examples of the input voltage to the power transmitting unit 303 determined based on GP. With reference to table 1002, for example, the TX 102 can determine the input voltage for a case where GP is 5 watts to be 5 volts, the input voltage for a case where GP is 15 watts to be 9 volts, and so on. Each value of table 1002 is a value that has been determined in advance, based on the electrical properties of the power transmitting unit 303 of the TX 102, in order to efficiently transmit power, and is held in the memory 309. Note that the power source unit 302 and the variable voltage circuit 311 may be external devices that operate based on the USB PD standard. In this case, the input voltage to the power transmitting unit 303 may be acquired from the external device (power source unit 302) via communication, or may be held in the memory 309 as a table prescribed by the USB PD standard. Note that the table 1002 held by the TX 102 and the table 1001 held by the RX 101 may be the same, or may be different.

Returning to FIG. 5A, after setting the input voltage, the TX 102 acquires parameters for foreign object detection processing through processing in the Calibration phase (S505). Processing in the Calibration phase is started upon reception of a Received Power Packet including Mode=1 from the RX 101. Upon receiving this packet, in a case where there are parameters for foreign object detection processing that have already been stored until then, the TX 102 discards these parameters. The TX 102 stores the received power included in the Received Power Packet (Mode=1) received from the RX 101 and the power loss indicating the difference from the transmitted power in the power transmitting unit 303 at that time, in association with each other, into the memory 309. Note that the transmitted power, in place of the power loss, may be stored in association with the received power, or both of the power loss and the transmitted power may be stored in association with the received power.

Table 800 of FIG. 8 shows one example of the contents of parameters for foreign object detection processing stored in the memory 309. For example, information in row 801 indicates that the power loss is 0.6 watts when the received power notified from the RX 101 is 0.1 watts. Thereafter, each time a Received Power Packet (Mode=2) is received from the RX 101, the TX 102 adds a row in table 800. Note that as stated earlier, in a case where Mode=0, the TX 102 does not add a row. Also, in a case where Mode=1, the TX 102 clears the contents of table 800 up until that point.

Returning to FIG. 5A, the TX 102 starts foreign object detection processing and power transmission (S506, S507). The foreign object detection processing in the TX 102 is processing that is executed regularly while wireless power transmission is performed, and is carried out in the following manner, for example. First, the TX 102 regularly acquires information of the current received power from the RX 101. Note that as the RX 101 regularly transmits information of the received power via a Received Power Packet including Mode=0 as stated earlier (S419), the TX 102 receives the same. Then, the TX 102 calculates the expected value of the power loss corresponding to the acquired received power by way of linear interpolation between respective points with use of parameters for foreign object detection processing in table 800 of FIG. 8. For example, the aforementioned expression 1 can be used in linear interpolation. The TX 102 calculates the power loss from the difference between the measured transmitted power and the acquired received power. Then, in a case where the difference between the calculated power loss and the calculated expected value exceeds a predetermined threshold, the TX 102 determines that there is a power loss caused by a foreign object, such as a metallic piece, and determines that the foreign object exists in a power transmission range. If it is determined that the foreign object exists in the power transmission range, the control unit 201 of the TX 102 restricts power transmission to the RX 101. Specifically, the control unit 201 controls the power transmitting unit 303 to stop power transmission or lower the transmitted power. Also, the control unit 201 may notify the RX 101 of the existence of the foreign object via the communication unit 306. Furthermore, the control unit 201 may provide a notification about the restriction on the transmitted power.

Figure 9:
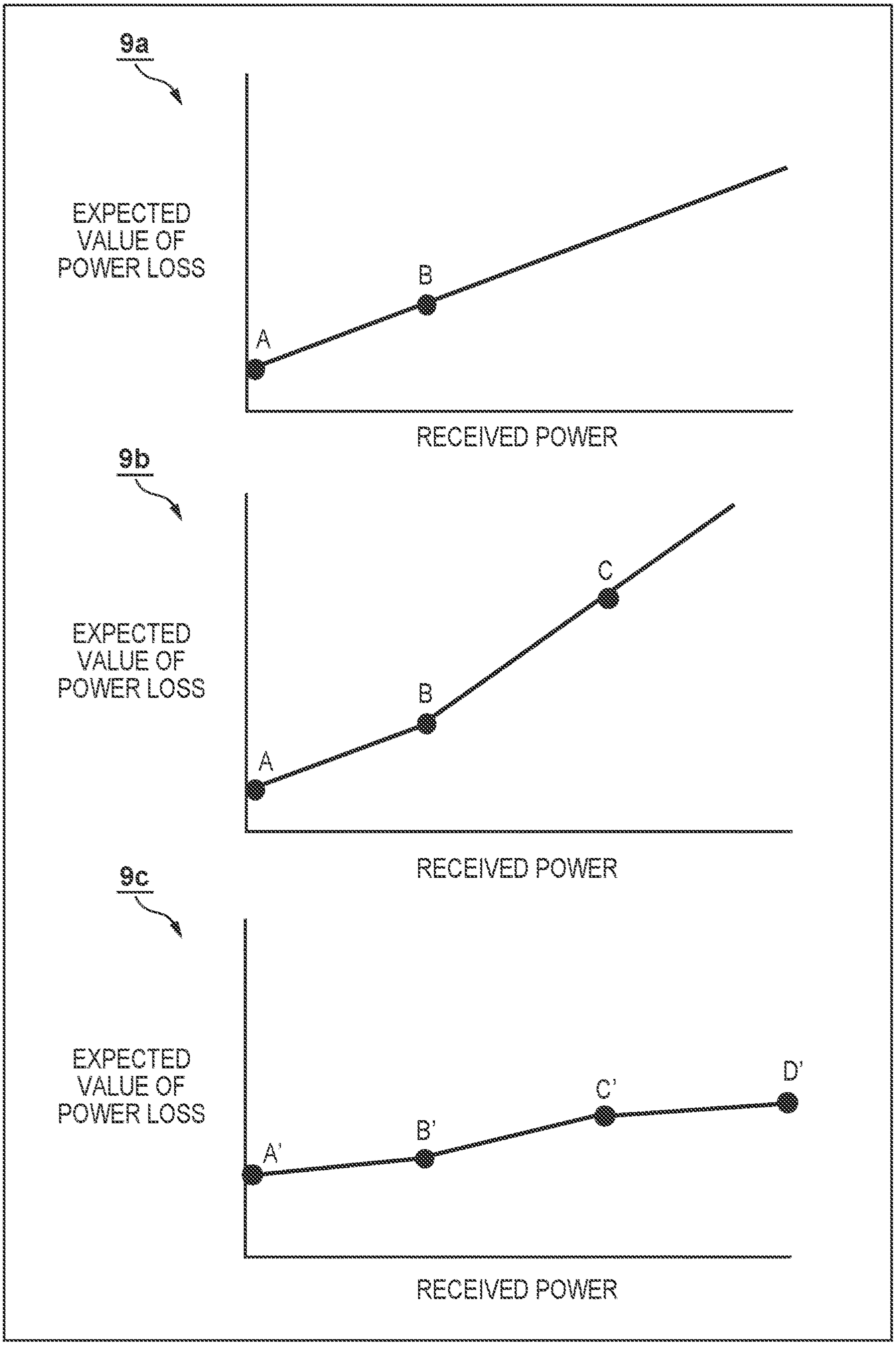
FIG. 9 is a diagram showing linear complementation in foreign object detection processing according to the first embodiment.

A more specific description of the foreign object detection processing is now given, using an exemplary case where the contents of parameters for foreign object detection processing are the contents shown in row 801 and row 802 of table 800 of FIG. 8. FIG. 9 shows graphs (9*a* to 9*c*) indicating a relationship between the received power and the expected value of the power loss after linear complementation. Point A and point B in the graph 9*a* of FIG. 9 are obtained respectively by plotting row 801 and row 802 in a diagram in which the received power and the power loss are represented by the axes. The TX 102 derives the expected value of the power loss corresponding to the current received power by way of linear complementation represented by a straight line connecting between point A and point B. For example, in a case where the value of the current received power (RP) is 2.5 watts, the numerical values of row 801 (RP1=0.1 watts, PL1=0.6 watts) and row 802 (RP1=4.9 watts, PL2=1.6 watts) are fitted to the aforementioned expression 1. In this case, the expected value PL of the power loss is as follows.

$$PL=(1.6-0.6)/(4.9-0.1)*(2.5-0.1)+0.6=1.1$$

Then, the TX 102 calculates the power loss from the difference between the current transmitted power and the current received power (RP=2.5 watts). In a case where the difference between the value of the calculated power loss and the expected value (PL=1.1 watts) is equal to or larger than the threshold, the TX 102 determines that there is a power loss caused by the foreign object, and determines that the foreign object exists in the power transmission range. The threshold may be an absolute value, such as 1 watt, or may be a relative value, such as 50% of the expected value. Information related to this threshold is stored in the memory 309. Also, the threshold may change in a stepwise manner in accordance with the received power and the expected value of the power loss.

Returning to FIG. 5A, the TX 102 accepts GP negotiation from the RX 101 also during power transmission. Upon accepting GP negotiation from the RX 101, GP is updated (S508). Note that if there is no GP negotiation, S508 is skipped. Also, as stated earlier, there is a case where a request for reacquisition of parameters for foreign object detection processing is received from the RX 101. In a case where the request for reacquisition of parameters for foreign object detection processing has been received (YES of S509), the TX 102 returns an ACK (S510), and processing returns to S504. In this way, the TX 102 resets the input voltage on the variable voltage circuit 311 and reacquires parameters for object detection processing in the Calibration phase in response to the request for reacquisition from the RX 101.

Figure 5B:
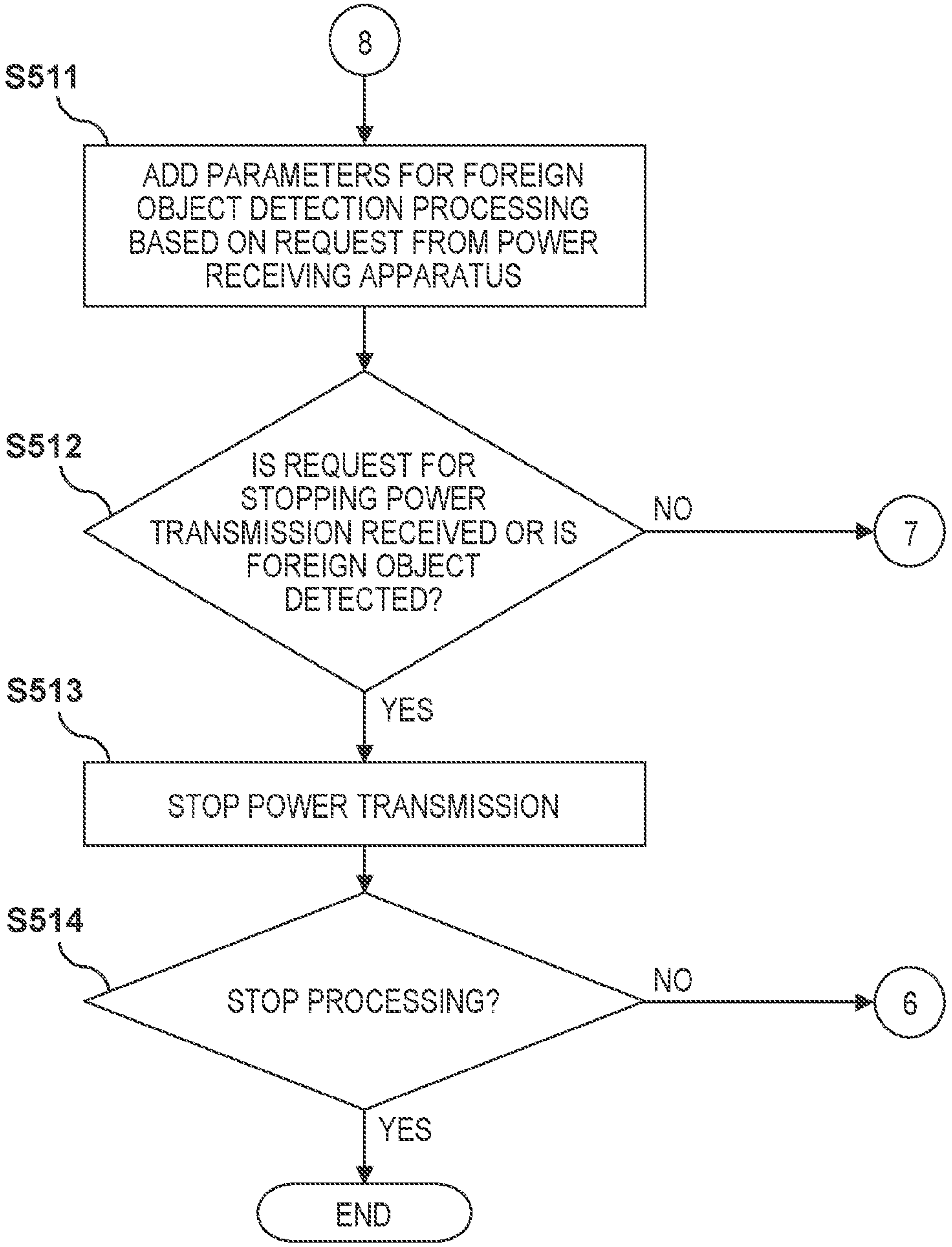
FIG. 5B is a flowchart showing an exemplary flow of processing of the power transmitting apparatus according to the first embodiment.

On the other hand, in a case where the request for reacquisition of parameters for foreign object detection processing has not been received (NO of S509), processing proceeds to S511 of FIG. 5B. In a case where there has been a request for addition of parameters for foreign object detection processing from the RX 101, the TX 102 adds parameters for foreign object detection processing (S511). In processing for adding parameters for foreign object detection processing, the TX 102 receives a received power of a value higher than the existing GP value from the RX 101, calculates the difference from the transmitted power at that time as the power loss, and adds and holds the received power and the calculated power loss in table 800 in association with each other. For example, in a case where the transmitted power at the time of reception of a received power of 9.9 watts from the RX 101 is 13.4 watts, the TX 102 acquires the difference therebetween, namely 3.5 watts as the power loss. The TX 102 holds the received power of 3.5 watts and the power loss of 9.9 watts in association with each other as additional parameters for foreign object detection processing. This state is indicated by row 803 in table 800 of FIG. 8. Row 803 is equivalent to point C in the graph 9*b* of FIG. 9. As a result, in a case where the received power has become higher than the existing GP value, the TX 102 can derive the expected value of the power loss more accurately, and can detect the foreign object more accurately. Note that if there is no request for addition of parameters for foreign object detection processing from the RX 101, S511 is skipped.

Returning to FIG. 5B, the TX 102 determines whether a request for stopping power transmission has been received from the RX 101, or a foreign object has been detected (S512). In a case where neither the reception of the request for stopping power transmission nor the detection of a foreign object has been done (NO of S512), processing returns to S508 of FIG. 5A, and the TX 102 continues power transmission by repeating the aforementioned processing. In a case where the request for stopping power transmission has been received, or in a case where a foreign object has been detected (YES of S512), the TX 102 stops power transmission (S513). Thereafter, the TX 102 determines whether to end processing (S514), and in a case where it is determined that processing is to be ended (YES of S514), the present processing is ended. On the other hand, in a case where processing is not to be ended (NO of S514), processing return to S501, and the aforementioned processing is repeated. Whether to end the present processing is determined based on, for example, the content of an operation that has been performed by a user with respect to the operation unit 308.

[System Operations]

Figure 6A:
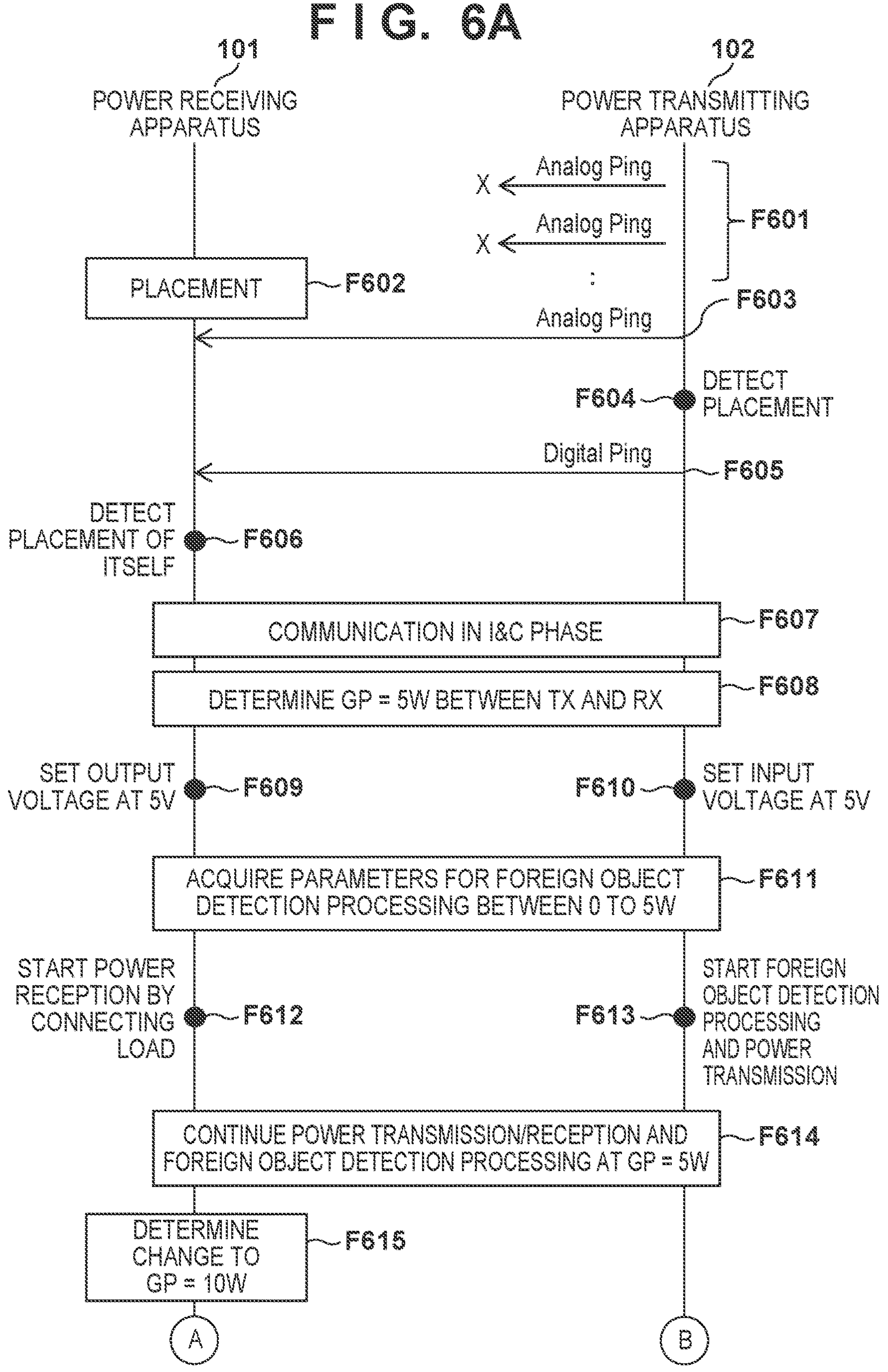
FIG. 6A is a diagram showing an exemplary flow of processing executed in the wireless charging system.
Figure 6B:
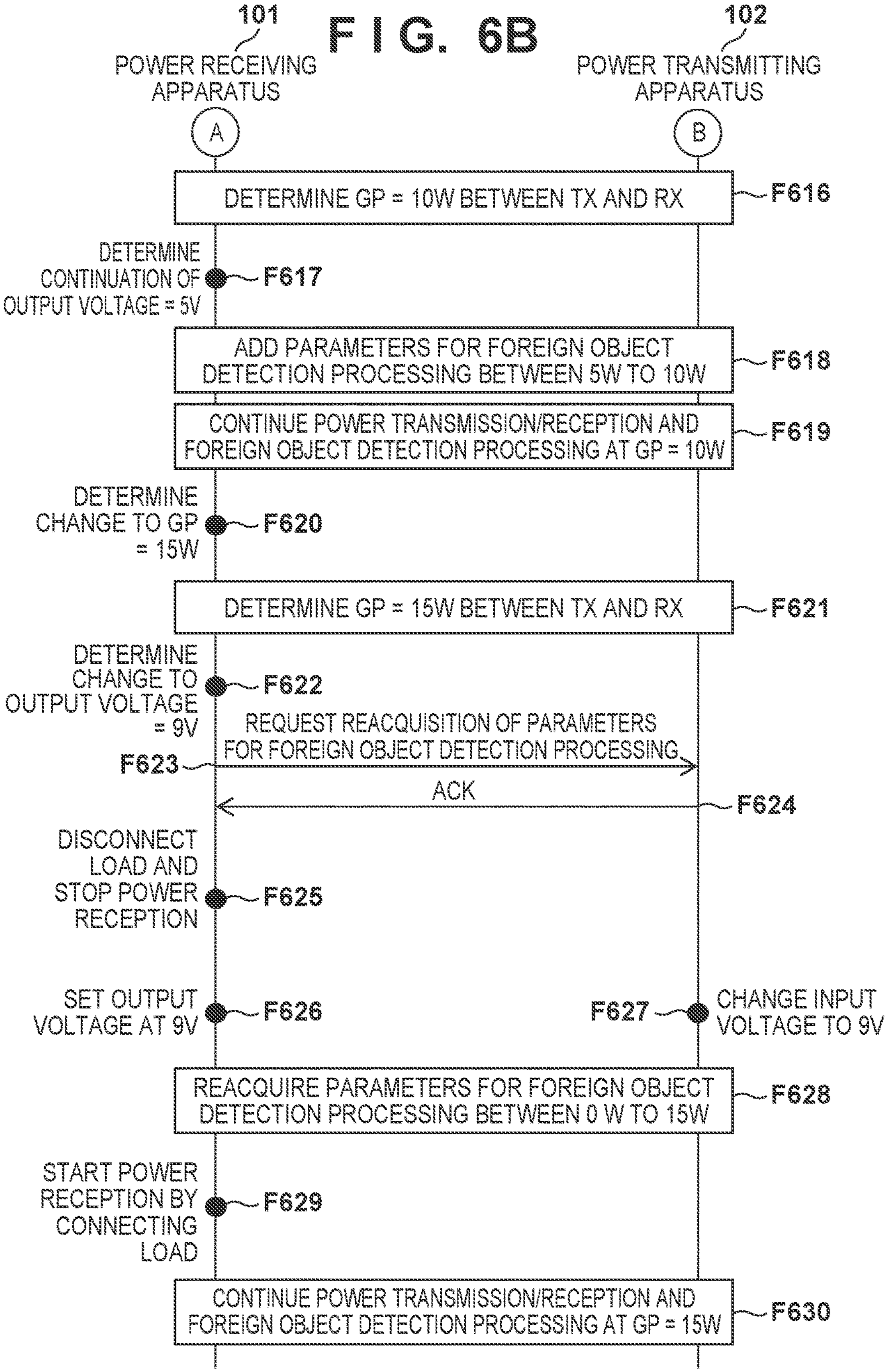
FIG. 6B is a diagram showing an exemplary flow of processing executed in the wireless charging system.

Using FIG. 6A and FIG. 6B, a description is now given of an operational sequence of the RX 101 and the TX 102 that has been described using FIG. 4A, FIG. 4B, FIG. 5A, and FIG. 5B. It is assumed that, in FIGS. 6A and 6B, time passes in the direction from up to down. It is assumed that, in an initial state, the RX 101 is not placed on the TX 102, and the load of the RX 101 (the charging unit 211) is not connected to the power receiving unit 203. Also, it is assumed that the power necessitated by the charging unit 211 of the RX 101 is 5 watts at first, and then increases to 10 watts and 15 watts after the Power Transfer phase is started.

First, the TX 102 transmits an Analog Ping, and waits for an object to be placed on the charging stand 103 (F601, S501). Once the RX 101 has been placed F602), the voltage or the current of the Analog Ping changes (F603). Based on this change, the TX 102 detects that the object has been placed (F604). Upon detecting the placement of the object, the TX 102 transmits a Digital Ping (F605). The RX 101 detects the placement of itself on the TX 102 by receiving this Digital Ping (F606). Also, the TX 102 detects that the object placed on the charging stand 103 is the RX 101 via a response to the Digital Ping. Subsequently, the RX 101 transmits identification information and device configuration information (capability information) to the TX 102 via communication in the I&C phase (F607, S402, S502).

Subsequently, GP is determined between the RX 101 and the TX 102 (F608, S403, S503). Here, GP is 5 watts as the RX 101 requests 5 watts, which is necessary at first. As GP is 5 watts, the RX 101 sets the output voltage at 5 volts with reference to table 1001 (F609, S404, S405). Similarly, the TX 102 sets the input voltage at 5 volts with reference to table 1002 (F610, S504). Subsequently, parameters for foreign object detection processing corresponding to GP=0 watts to 5 watts are acquired through processing in the Calibration phase, and held in the TX 102 (F611, S406, S505). At this point, parameters for foreign object detection processing held in the TX 102 are the contents equivalent to the graph 9*a* of FIG. 9. Subsequently, the RX 101 starts power reception (F612, S407), and the TX 102 starts foreign object detection processing and power transmission (F613, S506, S507).

Thereafter, the power transmission/reception and the foreign object detection processing are continued at GP=5 watts for a while (the loop of F614, S408→NO of S409→S419→NO of S420→S408, and the loop of S508→NO of S509→S511→NO of S512→S508). When the charging unit 211 necessitates 10 watts (F615, S408, YES of S409), GP is updated to 10 watts between the RX 101 and the TX 102 (F616, S410, S508). Once GP has been updated to 10 watts, the RX 101 determines that the output voltage of 5 volts is to be continued with reference to table 1001 (F617, S411). As the current output voltage is to be continued, the RX 101 requests addition of parameters for foreign object detection processing within the range of 5 to 10 watts (F618, NO of S412, S418). As a result, point C in the graph 9*b* of FIG. 9 is added to parameters for foreign object detection processing held in the TX 102. Note that as calibration processing for point A and point B has already been executed in F611, the result thereof is maintained.

Thereafter, the power transmission/reception and the foreign object detection processing are continued at GP=10 watts for a while (the loop of F619, S408→NO of S409→S419→NO of S420→S408, and the loop of S508→NO of S509→S511→NO of S512→S508). When the charging unit 211 necessitates 15 watts (F620, S408, YES of S409), GP is updated to 15 watts between the RX 101 and the TX 102 (F621, S410, S508). Once GP has been updated to 15 watts, the RX 101 determines that the output voltage is to be changed to 9 volts with reference to table 1001 (F622, S411). As the output voltage is to be changed, the RX 101 makes a request to the TX 102 for reacquisition of parameters for foreign object detection processing (F623, YES of S412). If an ACK is returned in response thereto (F624, YES of S414, YES of S509, S510), the RX 101 disconnects the load and stops power reception (F625, S415).

Subsequently, the RX 101 sets the determined output voltage=9 volts on the variable voltage circuit 212, and waits until this output voltage stabilizes (F626, S405). On the other hand, after transmitting the ACK, the TX 102 changes the input voltage to the power transmitting unit 303 to 9 volts with reference to table 1002 based on GP=15 watts (F627, S504). Thereafter, processing in the Calibration phase is executed at GP=0 to 15 watts (F628, S406, S505). At the beginning of the Calibration phase, the TX 102 clears parameters for foreign object detection processing that have been held up until that point. Then, in a state where the output voltage to the load of the RX 101 has been changed to 9 volts, the TX 102 reacquires information of respective points corresponding to 0 watts, 5 watts, 10 watts, and 15 watts as parameters for foreign object detection processing. Furthermore, at this time, the variable voltage circuit 212 of the RX 101 and the variable voltage circuit 311 of the TX 102 are each in a state where 9 volts, which is the voltage based on GP, has been set thereon. That is to say, they are in a state where they are electrically different when parameters for foreign object detection processing have been updated in F611 and F618. Therefore, points A', B', C', and D' of the graph 9*c*, which are different from points A, B, and C of the graph 9*b* of FIG. 9, are acquired as a result of calibration processing in F628.

Thereafter, the RX 101 connects the load and starts the power reception (F629, S407); from then on, the power transmission/reception and the foreign object detection processing are continued at GP=15 watts (F630).

In the above-described operations, the RX 101 changes GP from 5 watts to 10 watts and 15 watts based on the power necessitated by the charging unit 211, which is a load. When GP is to be increased from 5 watts to 10 watts, the RX 101 requests addition of parameters for foreign object detection processing while leaving the output voltage of 5 volts unchanged (F618). Also, when GP is to be increased from 10 watts to 15 watts, the RX 101 changes the output voltage to 9 volts, and then requests reacquisition of parameters for foreign object detection processing (F623). That is to say, the RX 101 selects an appropriate output voltage based on the power necessitated by the load, and when the output voltage is to be changed, performs control so that parameters for foreign object detection are reacquired in the state of the changed output voltage. In this way, even in a case where the electrical state of the RX 101 has changed due to a change in the output voltage, a foreign object can be detected more accurately using parameters that have been updated in accordance with the state of the change. Furthermore, when GP is increased while the output voltage remains unchanged, the RX 101 performs additional calibration processing in the range of the increase in GP. As a result, in a case where the received power and the power loss change nonlinearly, a foreign object can be detected more accurately.

Note that the RX 101 may add information of the output voltage determined in S411 to a request for reacquisition of parameters for foreign object detection processing, and the TX 102 may store this information of the output voltage in the memory 309 in association with table 800 of FIG. 8. That is to say, the TX 102 holds tables 800 for the output voltages included in the requests for reacquisition, respectively, in the memory 309. Then, upon receiving a request for reacquisition from the RX 101, in a case where there is table 800 that matches the output voltage included in this request, the TX 102 may use information of table 800 in the memory 309 that corresponds to the output voltage as parameters. This reduces repeated reacquisition of parameters for foreign object detection processing that correspond to the output voltage acquired in the past, and allows parameters for foreign object detection processing to be set efficiently. As a result, the efficiency of processing for charging the battery 202 increases.

Also, the RX 101 may add information indicating the reason for reacquisition to a request for reacquisition of parameters for foreign object detection processing. In this way, the TX 102 can notify a user of the reason for reacquisition via the notification unit 307. Also, via this notification, the user can learn of temporary suspension of power transmission due to a change in the output voltage.

Note that the voltage applied to a load may be determined based on a change in power received by power receiving unit, or may be determined based on a change in power that is guaranteed to be output to the load (GP).

Second Embodiment

Figure 11:
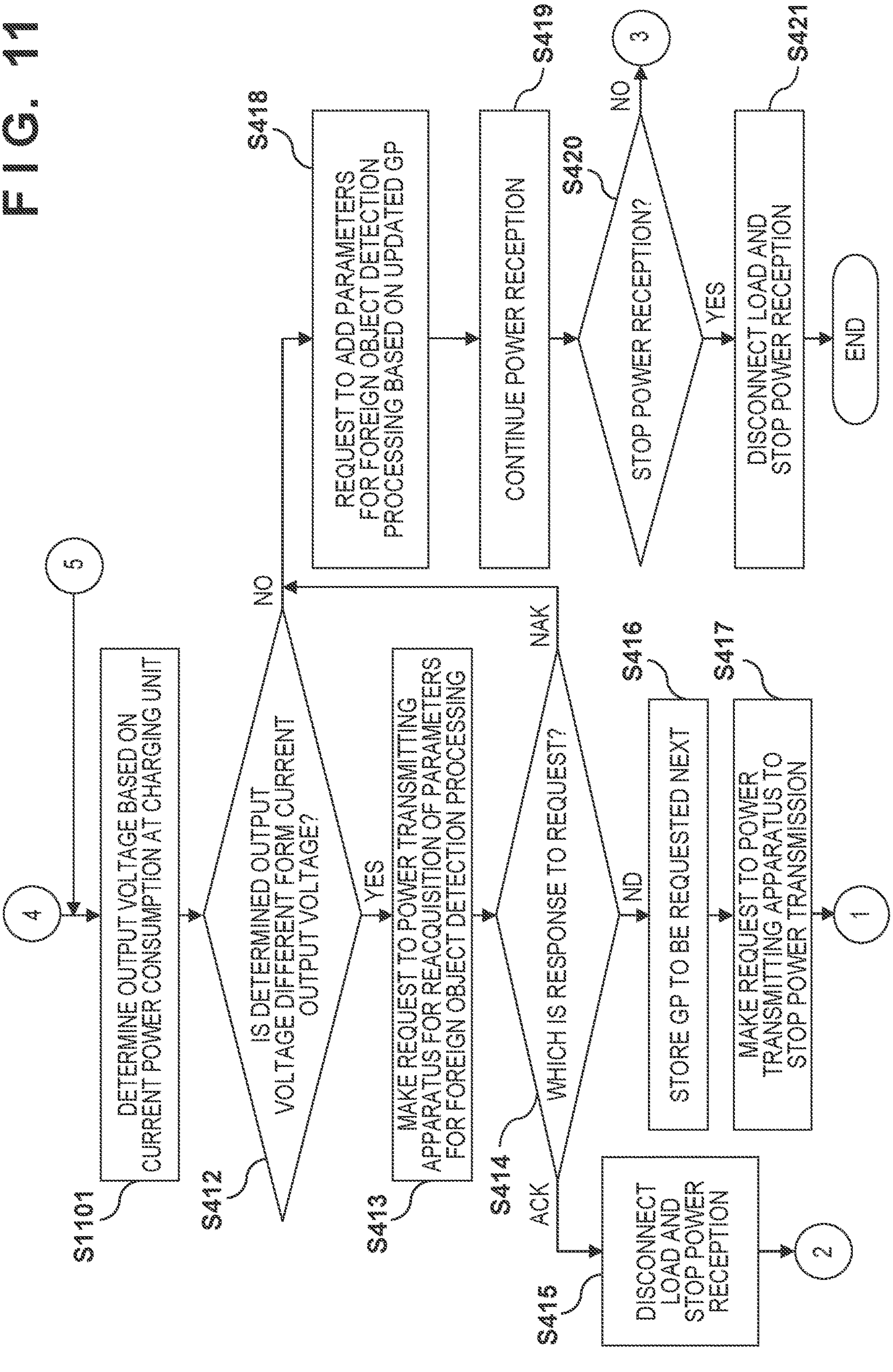
FIG. 11 is a flowchart showing an exemplary flow of processing of the power receiving apparatus according to a second embodiment.

In the first embodiment, the RX 101 determines the output voltage based on GP (FIG. 4B, S411). In a second embodiment, the RX 101 determines the output voltage based on the current power consumption in the charging unit 211, which is a load, in place of GP. FIG. 11 shows processing performed by the RX 101 in the second embodiment. Note that processing shown in FIG. 11 is obtained by replacing a part of processing of the first embodiment (processing shown in FIG. 4B). That is to say, the difference from the first embodiment is that S411 of FIG. 4B is replaced with S1101, and that processing proceeds to S1101 in the case of NO in S409 (the case where GP need not be changed). Also, in the RX 101 of the second embodiment, the voltage acquisition unit 213 can also acquire the magnitude of power that is supplied to and consumed by the charging unit 211.

In FIG. 11, the RX 101 starts the Power Transfer phase through processing similar to that of the first embodiment (S401 to S408). Subsequently, the RX 101 determines GP based on the power necessitated by the charging unit 211 (S408, S409, S410). Thereafter, the current power consumption in the charging unit 211 is acquired regardless of whether GP has been changed or not, and the output voltage to the charging unit 211 is determined based on the value thereof (S1101). Here, the RX 101 determines the output voltage with reference to table 1201 of FIG. 12. Table 1201 describes power consumption in the charging unit 211, and an output voltage to the charging unit 211 that increases efficiency with that power consumption. Also, it is assumed that table 1201 is held in the memory 209 in advance. According to the configuration of the second embodiment, the output voltage can be determined based on the current power consumption in the charging unit 211. Therefore, for example, even in a case where the charging unit 211 and the battery 202 are external devices and information of necessary power cannot be frequently acquired from the charging unit 211 in S408, an appropriate output voltage can be promptly determined.

In a case where the output voltage determined in S1101 is different from the current output voltage (YES of S412), processing proceeds to S413. Processing of S413 onward is similar to that of the first embodiment. Note that in a case where S405 is executed because it was determined that an ACK response was received in S414, the output voltage determined in S1101 is set on the variable voltage circuit 212. Also, in a case where S416 is executed because it was determined that an ND response was received in S414, the output voltage determined in S1101 is used as the output voltage set in S404. On the other hand, in a case where it is determined that the output voltage determined in S1101 is the same as the current output voltage, processing proceeds to S418. In a case where GP has been changed in S410, the RX 101 requests that the TX 102 add parameters for foreign object detection processing, similarly to the first embodiment. Meanwhile, in a case where GP has not been changed, processing of S418 is skipped. Processing of S419 onward is similar to that of the first embodiment.

Figure 12:
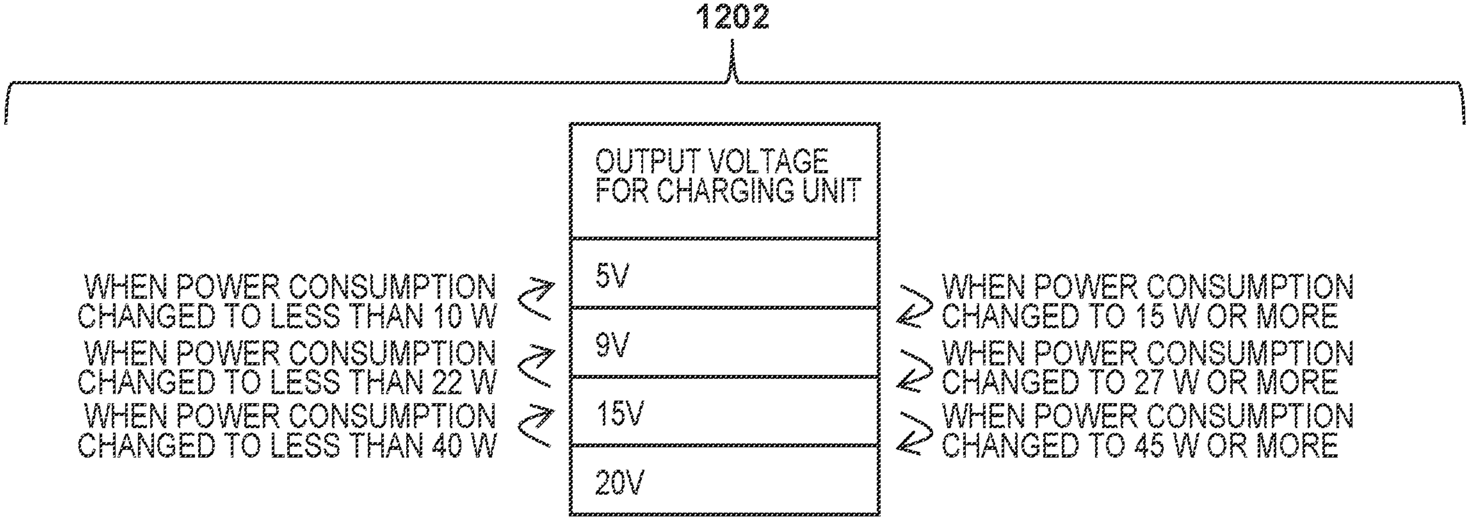
FIG. 12 is a diagram showing a relationship between power consumption in the charging unit and an output voltage to the charging unit according to the second embodiment.

Note that the RX 101 may determine the output voltage to the charging unit 211 based on table 1202 shown in FIG. 12, in place of table 1201. According to table 1202, the thresholds for power consumption differ between a case where the output voltage is increased and a case where it is reduced. In this way, in a case where the property of the power consumption in the charging unit 211 is such that the power consumption fluctuates between high and low in a short period of time, it is possible to reduce the frequent occurrence of the change in the output voltage and consequent processing of reacquisition of parameters for foreign object detection processing. Furthermore, as another method for solving a similar problem, the RX 101 may, with use of the timer 210, leave the output voltage unchanged for a predetermined time period after the output voltage is changed.

OTHER EMBODIMENTS

The present disclosure can be implemented by processing of supplying a program for implementing one or more functions of the above-described embodiments to a system or apparatus via a network or storage medium, and causing one or more processors in the computer of the system or apparatus to read out and execute the program. The present disclosure can also be implemented by a circuit (for example, an ASIC) for implementing one or more functions.

Note that at least a part of processing shown in the flowcharts of FIG. 4A, FIG. 4B, FIG. 5A, FIG. 5B, and FIG. 11 may be realized by hardware. In a case where it is realized by hardware, it is sufficient to, for example, automatically generate a dedicated circuit on an FPGA from a program for realizing each processing with use of a predetermined compiler. Furthermore, it may also be realized as hardware by forming a Gate Array circuit, similarly to the FPGA.

According to the present disclosure, even if the output voltage to a load has been changed in a power receiving apparatus, a decrease in the accuracy of foreign object detection processing based on a power loss can be suppressed.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

The invention claimed is:

1. A power receiving apparatus, comprising:

a power receiving unit that wirelessly receives power from a power transmitting apparatus;

a communication unit that communicates with the power transmitting apparatus; and a changing unit that changes a voltage of the power receiving apparatus, wherein the communication unit transmits a first received power packet including information indicating a first received power value, to the power transmitting apparatus, the changing unit changes, after the first received power packet is transmitted, a voltage of the power receiving apparatus based on an authentication to the power transmitting apparatus, and the communication unit transmits, after the voltage of the power receiving apparatus is changed, a second received power packet including information indicating a second received power value.

2. The power receiving apparatus according to claim 1, wherein the voltage is a voltage to be provided to a load.

3. The power receiving apparatus according to claim 1, wherein the changing unit changes Guaranteed Power and changes output power of the power receiving apparatus after the first received power packet is transmitted and the power transmitting apparatus is authenticated.

4. The power receiving apparatus according to claim 1, wherein calibration processing is initiated upon the first received power packet being transmitted.

5. The power receiving apparatus according to claim 4, wherein the calibration processing is again initiated upon the second received power packet being transmitted.

6. The power receiving apparatus according to claim 4, wherein a parameter to be used in foreign object detection processing performed by the power transmitting apparatus is obtained by the calibration processing.

7. The power receiving apparatus according to claim 1, wherein the authentication is an authentication based on an electronic certificate.

8. The power receiving apparatus according to claim 1, further comprising:

a convert unit that converts alternating-current power received by the power receiving unit into direct-current power.

9. The power receiving apparatus according to claim 8, wherein the changing unit changes the power of the convert unit.

10. A method performed by a power receiving apparatus, the method comprising:

transmitting a first received power packet including information indicating a first received power value, to the power transmitting apparatus;

changing, after the first received power packet is transmitted, a voltage of the power receiving apparatus based on an authentication to the power transmitting apparatus; and transmitting, after the voltage of the power receiving apparatus is changed, a second received power packet including information indicating a second received power value.

11. The method according to claim 10, wherein the changing comprises changing Guaranteed Power and changing output power of the power receiving apparatus after the first received power packet is transmitted and the power transmitting apparatus is authenticated.

* * * * *